US012584455B2

(12) United States Patent
Khalid et al.

(10) Patent No.: US 12,584,455 B2
(45) Date of Patent: *Mar. 24, 2026

(54) AIRFLOW MIXER ASSEMBLY FOR A GAS TURBINE ENGINE

(71) Applicant: General Electric Company, Evendale, OH (US)

(72) Inventors: Syed J. Khalid, Palm Beach Gardens, FL (US); David Marion Ostdiek, Liberty Township, OH (US); Randy M. Vondrell, Newport, KY (US); Brandon Wayne Miller, Liberty Township, OH (US); Craig William Higgins, Liberty Township, OH (US); Alexander Kimberley Simpson, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 75 days.

This patent is subject to a terminal disclaimer.

(21) Appl. No.: 18/612,316

(22) Filed: Mar. 21, 2024

(65) Prior Publication Data

US 2025/0250951 A1 Aug. 7, 2025

Related U.S. Application Data

(63) Continuation-in-part of application No. 17/879,384, filed on Aug. 2, 2022, now Pat. No. 12,031,504.

(Continued)

(51) Int. Cl.
| | |
|---|---|
| *F02K 3/077* | (2006.01) |
| *F02K 1/38* | (2006.01) |
| *F02K 3/06* | (2006.01) |

(52) U.S. Cl.
CPC .............. *F02K 3/077* (2013.01); *F02K 1/386* (2013.01); *F02K 3/06* (2013.01)

(58) Field of Classification Search
CPC ... F02K 1/386; F02K 1/46; F02K 1/48; F02K 1/82; F02K 1/822; F02K 3/02; F02K 3/025; F02K 3/06; F02K 3/065; F02K 3/077
See application file for complete search history.

(56) References Cited

U.S. PATENT DOCUMENTS

| | | | |
|---|---|---|---|
| 3,528,250 | A | 9/1970 | Johnson |
| 4,064,692 | A | 12/1977 | Johnson et al. |

(Continued)

*Primary Examiner* — Scott J Walthour
(74) *Attorney, Agent, or Firm* — Dority & Manning, P.A.

(57) ABSTRACT

A gas turbine engine is provided having a turbomachine; a primary fan driven by the turbomachine; a secondary fan located downstream of the primary fan within the inlet duct, the gas turbine engine defining a thrust to power airflow ratio between 3.5 and 100 and a core bypass ratio between 0.1 and 10; and an airflow mixer assembly comprising: a low pressure duct positioned within the core cowl; a plenum extending along the circumferential direction located downstream of the low pressure duct and in fluid communication with the low pressure duct; an inner shroud located downstream of the plenum and downstream of the exhaust and in fluid communication with both the plenum and the exhaust; and an outer shroud located outward of the plenum along the radial direction and extending along the circumferential direction and along the axial direction over and downstream of the inner shroud.

20 Claims, 25 Drawing Sheets

Related U.S. Application Data

(60) Provisional application No. 63/505,789, filed on Jun. 2, 2023.

(56) References Cited

U.S. PATENT DOCUMENTS

| | | | |
|---|---|---|---|
| 4,163,366 A | 8/1979 | Kent | |
| 8,961,114 B2 | 2/2015 | Ruthemeyer | |
| 9,267,434 B2 | 2/2016 | Campbell et al. | |
| 9,790,893 B2 | 10/2017 | Snyder | |
| 9,845,768 B2 | 12/2017 | Pesyna et al. | |
| 10,233,867 B2 | 3/2019 | Lovett | |
| 10,399,664 B2 | 9/2019 | Bowden et al. | |
| 10,634,060 B2 | 4/2020 | Song | |
| 10,794,288 B2 | 10/2020 | Schwarz et al. | |
| 11,078,837 B2 | 8/2021 | Zysman et al. | |
| 12,031,504 B2 * | 7/2024 | Miller | F02C 3/06 |
| 2008/0028763 A1 | 2/2008 | Schwarz et al. | |
| 2008/0141650 A1 * | 6/2008 | Johnson | F02K 3/06 |
| | | | 29/888.025 |
| 2008/0155961 A1 * | 7/2008 | Johnson | F02K 3/075 |
| | | | 60/226.3 |
| 2008/0271431 A1 * | 11/2008 | Porte | F02K 1/46 |
| | | | 60/226.1 |
| 2013/0056553 A1 | 3/2013 | Mouchoux et al. | |
| 2017/0089296 A1 * | 3/2017 | Bisson | F02K 3/06 |
| 2021/0108597 A1 | 4/2021 | Ostdiek et al. | |
| 2022/0042463 A1 | 2/2022 | Molesini et al. | |
| 2024/0044304 A1 * | 2/2024 | Miller | F02K 3/077 |

* cited by examiner

| R1/R3 | TPAR | CBR | RqRPrim.-FAN | RqRSec.-FAN |
|---|---|---|---|---|
| 1.489 | 4.7 | 1.41 | 0.25 | 0.60 |
| 1.581 | 4.9 | 1.01 | 0.25 | 0.60 |
| 1.663 | 5.1 | 0.65 | 0.25 | 0.60 |
| 1.758 | 5.2 | 0.35 | 0.25 | 0.60 |
| 1.420 | 7.6 | 2.31 | 0.25 | 0.60 |
| 1.508 | 7.8 | 1.63 | 0.25 | 0.60 |
| 1.587 | 8.0 | 1.04 | 0.25 | 0.60 |
| 1.677 | 8.1 | 0.56 | 0.25 | 0.60 |
| 1.930 | 8.2 | 0.11 | 0.25 | 0.60 |
| 1.330 | 12.2 | 3.82 | 0.25 | 0.60 |
| 1.412 | 12.4 | 2.66 | 0.25 | 0.60 |
| 1.486 | 12.6 | 1.68 | 0.25 | 0.60 |
| 1.581 | 12.7 | 0.99 | 0.30 | 0.60 |
| 1.610 | 12.7 | 0.99 | 0.35 | 0.60 |
| 1.610 | 12.7 | 0.99 | 0.35 | 0.60 |
| 1.812 | 12.7 | 0.99 | 0.25 | 0.55 |
| 1.839 | 12.7 | 0.99 | 0.30 | 0.55 |
| 1.873 | 12.7 | 0.99 | 0.35 | 0.55 |
| 1.873 | 12.7 | 0.99 | 0.35 | 0.55 |
| 1.223 | 12.7 | 0.99 | 0.25 | 0.65 |
| 1.242 | 12.7 | 0.99 | 0.30 | 0.65 |
| 1.264 | 12.7 | 0.99 | 0.35 | 0.65 |
| 1.264 | 12.7 | 0.99 | 0.35 | 0.65 |
| 1.570 | 12.7 | 0.91 | 0.25 | 0.60 |
| 1.628 | 12.7 | 0.71 | 0.30 | 0.60 |
| 1.658 | 12.7 | 0.71 | 0.35 | 0.60 |
| 1.658 | 12.7 | 0.71 | 0.35 | 0.60 |
| 1.876 | 12.7 | 0.71 | 0.25 | 0.55 |
| 1.904 | 12.7 | 0.71 | 0.30 | 0.55 |
| 1.939 | 12.7 | 0.71 | 0.35 | 0.55 |
| 1.939 | 12.7 | 0.71 | 0.35 | 0.55 |
| 1.242 | 12.7 | 0.71 | 0.25 | 0.65 |
| 1.260 | 12.7 | 0.71 | 0.30 | 0.65 |
| 1.283 | 12.7 | 0.71 | 0.35 | 0.65 |
| 1.283 | 12.7 | 0.71 | 0.35 | 0.65 |
| 1.702 | 12.8 | 0.42 | 0.30 | 0.60 |
| 1.733 | 12.8 | 0.42 | 0.35 | 0.60 |
| 1.733 | 12.8 | 0.42 | 0.35 | 0.60 |
| 1.973 | 12.8 | 0.42 | 0.25 | 0.55 |
| 2.003 | 12.8 | 0.42 | 0.30 | 0.55 |
| 2.039 | 12.8 | 0.42 | 0.35 | 0.55 |
| 2.039 | 12.8 | 0.42 | 0.35 | 0.55 |
| 1.278 | 12.8 | 0.42 | 0.25 | 0.65 |
| 1.298 | 12.8 | 0.42 | 0.30 | 0.65 |

FIG. 4A

| R1/R3 | TPAR | CBR | RqRPrim.-FAN | RqRSec.-FAN |
|---|---|---|---|---|
| 1.321 | 12.8 | 0.42 | 0.35 | 0.65 |
| 1.321 | 12.8 | 0.42 | 0.35 | 0.65 |
| 1.812 | 12.8 | 0.17 | 0.25 | 0.60 |
| 1.839 | 12.8 | 0.17 | 0.30 | 0.60 |
| 1.873 | 12.8 | 0.17 | 0.35 | 0.60 |
| 1.873 | 12.8 | 0.17 | 0.35 | 0.60 |
| 2.144 | 12.8 | 0.17 | 0.25 | 0.55 |
| 2.176 | 12.8 | 0.17 | 0.30 | 0.55 |
| 2.216 | 12.8 | 0.17 | 0.35 | 0.55 |
| 2.216 | 12.8 | 0.17 | 0.35 | 0.55 |
| 1.362 | 12.8 | 0.17 | 0.25 | 0.65 |
| 1.383 | 12.8 | 0.17 | 0.30 | 0.65 |
| 1.408 | 12.8 | 0.17 | 0.35 | 0.65 |
| 1.408 | 12.8 | 0.17 | 0.35 | 0.65 |
| 2.492 | 13.2 | 2.84 | 0.25 | 0.60 |
| 2.295 | 13.3 | 2.99 | 0.25 | 0.60 |
| 2.010 | 13.5 | 3.26 | 0.25 | 0.60 |
| 1.788 | 13.7 | 3.55 | 0.25 | 0.60 |
| 2.671 | 13.8 | 2.11 | 0.30 | 0.60 |
| 2.720 | 13.8 | 2.11 | 0.35 | 0.60 |
| 2.720 | 13.8 | 2.11 | 0.35 | 0.60 |
| 2.969 | 13.8 | 2.11 | 0.25 | 0.55 |
| 3.013 | 13.8 | 2.11 | 0.30 | 0.55 |
| 3.068 | 13.8 | 2.11 | 0.35 | 0.55 |
| 3.068 | 13.8 | 2.11 | 0.35 | 0.55 |
| 2.209 | 13.8 | 2.11 | 0.25 | 0.65 |
| 2.242 | 13.8 | 2.11 | 0.30 | 0.65 |
| 2.283 | 13.8 | 2.11 | 0.35 | 0.65 |
| 2.283 | 13.8 | 2.11 | 0.35 | 0.65 |
| 2.647 | 13.9 | 2.03 | 0.25 | 0.60 |
| 2.780 | 14.2 | 1.54 | 0.30 | 0.60 |
| 2.831 | 14.2 | 1.54 | 0.35 | 0.60 |
| 2.831 | 14.2 | 1.54 | 0.35 | 0.60 |
| 3.129 | 14.2 | 1.54 | 0.25 | 0.55 |
| 3.176 | 14.2 | 1.54 | 0.30 | 0.55 |
| 3.234 | 14.2 | 1.54 | 0.35 | 0.55 |
| 3.234 | 14.2 | 1.54 | 0.35 | 0.55 |
| 2.239 | 14.2 | 1.54 | 0.25 | 0.65 |
| 2.273 | 14.2 | 1.54 | 0.30 | 0.65 |
| 2.314 | 14.2 | 1.54 | 0.35 | 0.65 |
| 2.314 | 14.2 | 1.54 | 0.35 | 0.65 |
| 2.783 | 14.4 | 1.32 | 0.25 | 0.60 |
| 2.920 | 14.6 | 0.93 | 0.30 | 0.60 |
| 2.973 | 14.6 | 0.93 | 0.35 | 0.60 |

FIG. 4B

| R1/R3 | TPAR | CBR | RqRPrim.-FAN | RqRSec.-FAN |
|---|---|---|---|---|
| 2.973 | 14.6 | 0.93 | 0.35 | 0.60 |
| 3.334 | 14.6 | 0.93 | 0.25 | 0.55 |
| 3.384 | 14.6 | 0.93 | 0.30 | 0.55 |
| 3.446 | 14.6 | 0.93 | 0.35 | 0.55 |
| 3.446 | 14.6 | 0.93 | 0.35 | 0.55 |
| 2.277 | 14.6 | 0.93 | 0.25 | 0.65 |
| 2.311 | 14.6 | 0.93 | 0.30 | 0.65 |
| 2.354 | 14.6 | 0.93 | 0.35 | 0.65 |
| 2.354 | 14.6 | 0.93 | 0.35 | 0.65 |
| 2.942 | 14.8 | 0.72 | 0.25 | 0.60 |
| 3.376 | 15.1 | 0.14 | 0.25 | 0.60 |
| 3.427 | 15.1 | 0.14 | 0.30 | 0.60 |
| 3.490 | 15.1 | 0.14 | 0.35 | 0.60 |
| 3.490 | 15.1 | 0.14 | 0.35 | 0.60 |
| 3.994 | 15.1 | 0.14 | 0.25 | 0.55 |
| 4.054 | 15.1 | 0.14 | 0.30 | 0.55 |
| 4.129 | 15.1 | 0.14 | 0.35 | 0.55 |
| 4.129 | 15.1 | 0.14 | 0.35 | 0.55 |
| 2.540 | 15.1 | 0.14 | 0.25 | 0.65 |
| 2.625 | 15.1 | 0.14 | 0.35 | 0.65 |
| 1.271 | 15.5 | 4.98 | 0.25 | 0.60 |
| 1.348 | 15.7 | 3.46 | 0.25 | 0.60 |
| 1.419 | 15.8 | 2.18 | 0.25 | 0.60 |
| 1.499 | 15.9 | 1.17 | 0.25 | 0.60 |
| 1.735 | 16.0 | 0.21 | 0.25 | 0.60 |
| 2.703 | 16.6 | 3.32 | 0.25 | 0.60 |
| 2.476 | 16.7 | 3.51 | 0.25 | 0.60 |
| 2.146 | 16.9 | 3.86 | 0.25 | 0.60 |
| 2.833 | 17.0 | 2.84 | 0.30 | 0.60 |
| 2.885 | 17.0 | 2.84 | 0.35 | 0.60 |
| 2.885 | 17.0 | 2.84 | 0.35 | 0.60 |
| 3.126 | 17.0 | 2.84 | 0.25 | 0.55 |
| 3.173 | 17.0 | 2.84 | 0.30 | 0.55 |
| 3.232 | 17.0 | 2.84 | 0.35 | 0.55 |
| 3.232 | 17.0 | 2.84 | 0.35 | 0.55 |
| 2.373 | 17.0 | 2.84 | 0.25 | 0.65 |
| 2.408 | 17.0 | 2.84 | 0.30 | 0.65 |
| 2.453 | 17.0 | 2.84 | 0.35 | 0.65 |
| 2.453 | 17.0 | 2.84 | 0.35 | 0.65 |
| 1.888 | 17.2 | 4.23 | 0.25 | 0.60 |
| 2.869 | 17.3 | 2.38 | 0.25 | 0.60 |
| 3.318 | 17.6 | 2.08 | 0.25 | 0.55 |
| 3.368 | 17.6 | 2.08 | 0.30 | 0.55 |
| 3.430 | 17.6 | 2.08 | 0.35 | 0.55 |

FIG. 4C

| R1/R3 | TPAR | CBR | RqRPrim.-FAN | RqRSec.-FAN |
|-------|------|-----|--------------|-------------|
| 3.430 | 17.6 | 2.08 | 0.35 | 0.55 |
| 2.415 | 17.6 | 2.08 | 0.25 | 0.65 |
| 2.452 | 17.6 | 2.08 | 0.30 | 0.65 |
| 2.497 | 17.6 | 2.08 | 0.35 | 0.65 |
| 2.497 | 17.6 | 2.08 | 0.35 | 0.65 |
| 3.019 | 17.9 | 1.54 | 0.25 | 0.60 |
| 3.123 | 18.1 | 1.26 | 0.30 | 0.60 |
| 3.181 | 18.1 | 1.26 | 0.35 | 0.60 |
| 3.181 | 18.1 | 1.26 | 0.35 | 0.60 |
| 3.554 | 18.1 | 1.26 | 0.25 | 0.55 |
| 3.607 | 18.1 | 1.26 | 0.30 | 0.55 |
| 3.673 | 18.1 | 1.26 | 0.35 | 0.55 |
| 3.673 | 18.1 | 1.26 | 0.35 | 0.55 |
| 2.457 | 18.1 | 1.26 | 0.25 | 0.65 |
| 2.494 | 18.1 | 1.26 | 0.30 | 0.65 |
| 2.540 | 18.1 | 1.26 | 0.35 | 0.65 |
| 2.540 | 18.1 | 1.26 | 0.35 | 0.65 |
| 3.190 | 18.4 | 0.84 | 0.25 | 0.60 |
| 3.376 | 18.6 | 0.52 | 0.30 | 0.60 |
| 3.962 | 18.6 | 0.52 | 0.30 | 0.55 |
| 4.034 | 18.6 | 0.52 | 0.35 | 0.55 |
| 4.034 | 18.6 | 0.52 | 0.35 | 0.55 |
| 2.555 | 18.6 | 0.52 | 0.25 | 0.65 |
| 2.593 | 18.6 | 0.52 | 0.30 | 0.65 |
| 2.641 | 18.6 | 0.52 | 0.35 | 0.65 |
| 2.641 | 18.6 | 0.52 | 0.35 | 0.65 |
| 3.579 | 18.8 | 0.26 | 0.30 | 0.60 |
| 3.645 | 18.8 | 0.26 | 0.35 | 0.60 |
| 3.645 | 18.8 | 0.26 | 0.35 | 0.60 |
| 4.162 | 18.8 | 0.26 | 0.25 | 0.55 |
| 4.225 | 18.8 | 0.26 | 0.30 | 0.55 |
| 4.302 | 18.8 | 0.26 | 0.35 | 0.55 |
| 4.302 | 18.8 | 0.26 | 0.35 | 0.55 |
| 2.668 | 18.8 | 0.26 | 0.25 | 0.65 |
| 2.708 | 18.8 | 0.26 | 0.30 | 0.65 |
| 2.757 | 18.8 | 0.26 | 0.35 | 0.65 |
| 2.757 | 18.8 | 0.26 | 0.35 | 0.65 |
| 3.683 | 18.8 | 0.16 | 0.25 | 0.60 |
| 3.797 | 18.8 | 0.13 | 0.30 | 0.60 |
| 3.867 | 18.8 | 0.13 | 0.35 | 0.60 |
| 3.867 | 18.8 | 0.13 | 0.35 | 0.60 |
| 4.578 | 18.8 | 0.13 | 0.35 | 0.55 |
| 4.578 | 18.8 | 0.13 | 0.35 | 0.55 |
| 2.807 | 18.8 | 0.13 | 0.25 | 0.65 |

FIG. 4D

| R1/R3 | TPAR | CBR | RqRPrim.-FAN | RqRSec.-FAN |
|---|---|---|---|---|
| 2.849 | 18.8 | 0.13 | 0.30 | 0.65 |
| 2.902 | 18.8 | 0.13 | 0.35 | 0.65 |
| 2.902 | 18.8 | 0.13 | 0.35 | 0.65 |
| 3.018 | 21.8 | 3.94 | 0.25 | 0.60 |
| 2.746 | 21.9 | 4.17 | 0.25 | 0.60 |
| 2.349 | 22.1 | 4.63 | 0.25 | 0.60 |
| 2.039 | 22.4 | 5.12 | 0.25 | 0.60 |
| 3.205 | 22.6 | 2.80 | 0.25 | 0.60 |
| 3.372 | 23.3 | 1.80 | 0.25 | 0.60 |
| 3.563 | 23.9 | 0.99 | 0.25 | 0.60 |
| 4.108 | 24.4 | 0.19 | 0.25 | 0.60 |
| 3.273 | 26.1 | 4.35 | 0.25 | 0.60 |
| 2.965 | 26.2 | 4.63 | 0.25 | 0.60 |
| 2.515 | 26.4 | 5.16 | 0.25 | 0.60 |
| 2.162 | 26.7 | 5.75 | 0.25 | 0.60 |
| 3.473 | 27.0 | 3.10 | 0.25 | 0.60 |
| 3.656 | 27.8 | 1.99 | 0.25 | 0.60 |
| 3.867 | 28.4 | 1.07 | 0.25 | 0.60 |
| 4.428 | 28.9 | 0.22 | 0.25 | 0.60 |
| 2.674 | 30.5 | 5.59 | 0.25 | 0.60 |
| 2.281 | 30.8 | 6.27 | 0.25 | 0.60 |
| 3.732 | 31.2 | 3.32 | 0.25 | 0.60 |
| 3.927 | 32.0 | 2.13 | 0.25 | 0.60 |
| 4.150 | 32.7 | 1.16 | 0.25 | 0.60 |
| 4.788 | 33.3 | 0.22 | 0.25 | 0.60 |
| 3.799 | 35.1 | 5.03 | 0.25 | 0.60 |
| 3.420 | 35.2 | 5.35 | 0.25 | 0.60 |
| 2.862 | 35.4 | 6.02 | 0.25 | 0.60 |
| 3.959 | 35.5 | 4.41 | 0.30 | 0.60 |
| 4.032 | 35.5 | 4.41 | 0.35 | 0.60 |
| 4.032 | 35.5 | 4.41 | 0.35 | 0.60 |
| 4.362 | 35.5 | 4.41 | 0.25 | 0.55 |
| 4.427 | 35.5 | 4.41 | 0.30 | 0.55 |
| 4.508 | 35.5 | 4.41 | 0.35 | 0.55 |
| 4.508 | 35.5 | 4.41 | 0.35 | 0.55 |
| 3.327 | 35.5 | 4.41 | 0.25 | 0.65 |
| 3.377 | 35.5 | 4.41 | 0.30 | 0.65 |
| 3.439 | 35.5 | 4.41 | 0.35 | 0.65 |
| 3.439 | 35.5 | 4.41 | 0.35 | 0.65 |
| 2.422 | 35.7 | 6.79 | 0.25 | 0.60 |
| 4.035 | 36.2 | 3.55 | 0.25 | 0.60 |
| 4.682 | 36.5 | 3.02 | 0.25 | 0.55 |
| 4.752 | 36.5 | 3.02 | 0.30 | 0.55 |
| 4.839 | 36.5 | 3.02 | 0.35 | 0.55 |

FIG. 4E

| R1/R3 | TPAR | CBR | RqRPrim.-FAN | RqRSec.-FAN |
|---|---|---|---|---|
| 4.839 | 36.5 | 3.02 | 0.35 | 0.55 |
| 3.400 | 36.5 | 3.02 | 0.25 | 0.65 |
| 3.451 | 36.5 | 3.02 | 0.30 | 0.65 |
| 3.514 | 36.5 | 3.02 | 0.35 | 0.65 |
| 3.514 | 36.5 | 3.02 | 0.35 | 0.65 |
| 4.245 | 37.0 | 2.27 | 0.25 | 0.60 |
| 4.464 | 37.5 | 1.55 | 0.30 | 0.60 |
| 4.546 | 37.5 | 1.55 | 0.35 | 0.60 |
| 4.546 | 37.5 | 1.55 | 0.35 | 0.60 |
| 5.101 | 37.5 | 1.55 | 0.25 | 0.55 |
| 5.177 | 37.5 | 1.55 | 0.30 | 0.55 |
| 5.272 | 37.5 | 1.55 | 0.35 | 0.55 |
| 5.272 | 37.5 | 1.55 | 0.35 | 0.55 |
| 3.477 | 37.5 | 1.55 | 0.25 | 0.65 |
| 3.529 | 37.5 | 1.55 | 0.30 | 0.65 |
| 3.594 | 37.5 | 1.55 | 0.35 | 0.65 |
| 3.594 | 37.5 | 1.55 | 0.35 | 0.65 |
| 4.487 | 37.7 | 1.23 | 0.25 | 0.60 |
| 5.162 | 38.3 | 0.24 | 0.25 | 0.60 |
| 6.208 | 38.4 | 0.20 | 0.25 | 0.55 |
| 6.301 | 38.4 | 0.20 | 0.30 | 0.55 |
| 6.417 | 38.4 | 0.20 | 0.35 | 0.55 |
| 6.417 | 38.4 | 0.20 | 0.35 | 0.55 |
| 3.936 | 38.4 | 0.20 | 0.25 | 0.65 |
| 3.995 | 38.4 | 0.20 | 0.30 | 0.65 |
| 4.069 | 38.4 | 0.20 | 0.35 | 0.65 |
| 4.069 | 38.4 | 0.20 | 0.35 | 0.65 |
| 4.185 | 41.8 | 5.36 | 0.25 | 0.60 |
| 3.754 | 41.9 | 5.73 | 0.25 | 0.60 |
| 3.118 | 42.1 | 6.48 | 0.25 | 0.60 |
| 2.616 | 42.5 | 7.36 | 0.25 | 0.60 |
| 4.446 | 42.9 | 3.77 | 0.25 | 0.60 |
| 4.677 | 43.8 | 2.41 | 0.25 | 0.60 |
| 4.943 | 44.5 | 1.30 | 0.25 | 0.60 |
| 5.664 | 45.2 | 0.26 | 0.25 | 0.60 |
| 4.577 | 48.6 | 5.59 | 0.25 | 0.60 |
| 4.092 | 48.7 | 5.99 | 0.25 | 0.60 |
| 3.378 | 48.9 | 6.81 | 0.25 | 0.60 |
| 2.814 | 49.3 | 7.77 | 0.25 | 0.60 |
| 4.859 | 49.7 | 3.92 | 0.25 | 0.60 |
| 5.112 | 50.7 | 2.50 | 0.25 | 0.60 |
| 5.158 | 56.5 | 6.05 | 0.35 | 0.60 |
| 5.158 | 56.5 | 6.05 | 0.35 | 0.60 |
| 5.528 | 56.5 | 6.05 | 0.25 | 0.55 |

FIG. 4F

| R1/R3 | TPAR | CBR | RqRPrim.-FAN | RqRSec.-FAN |
|-------|------|-----|--------------|-------------|
| 5.611 | 56.5 | 6.05 | 0.30 | 0.55 |
| 5.713 | 56.5 | 6.05 | 0.35 | 0.55 |
| 5.713 | 56.5 | 6.05 | 0.35 | 0.55 |
| 4.331 | 56.5 | 6.05 | 0.25 | 0.65 |
| 4.396 | 56.5 | 6.05 | 0.30 | 0.65 |
| 4.477 | 56.5 | 6.05 | 0.35 | 0.65 |
| 4.477 | 56.5 | 6.05 | 0.35 | 0.65 |
| 5.048 | 56.7 | 5.75 | 0.25 | 0.60 |
| 4.502 | 56.8 | 6.17 | 0.25 | 0.60 |
| 3.696 | 57.1 | 7.05 | 0.25 | 0.60 |
| 3.057 | 57.5 | 8.10 | 0.25 | 0.60 |
| 5.359 | 57.9 | 4.02 | 0.25 | 0.60 |
| 5.524 | 58.2 | 3.56 | 0.30 | 0.60 |
| 5.626 | 58.2 | 3.56 | 0.35 | 0.60 |
| 5.626 | 58.2 | 3.56 | 0.35 | 0.60 |
| 6.179 | 58.2 | 3.56 | 0.25 | 0.55 |
| 6.272 | 58.2 | 3.56 | 0.30 | 0.55 |
| 6.387 | 58.2 | 3.56 | 0.35 | 0.55 |
| 6.387 | 58.2 | 3.56 | 0.35 | 0.55 |
| 4.659 | 58.2 | 3.56 | 0.35 | 0.65 |
| 4.659 | 58.2 | 3.56 | 0.35 | 0.65 |
| 5.638 | 58.8 | 2.56 | 0.25 | 0.60 |
| 5.907 | 59.3 | 1.81 | 0.30 | 0.60 |
| 6.015 | 59.3 | 1.81 | 0.35 | 0.60 |
| 6.015 | 59.3 | 1.81 | 0.35 | 0.60 |
| 6.743 | 59.3 | 1.81 | 0.25 | 0.55 |
| 6.844 | 59.3 | 1.81 | 0.30 | 0.55 |
| 6.970 | 59.3 | 1.81 | 0.35 | 0.55 |
| 6.970 | 59.3 | 1.81 | 0.35 | 0.55 |
| 4.611 | 59.3 | 1.81 | 0.25 | 0.65 |
| 4.680 | 59.3 | 1.81 | 0.30 | 0.65 |
| 4.766 | 59.3 | 1.81 | 0.35 | 0.65 |
| 4.766 | 59.3 | 1.81 | 0.35 | 0.65 |
| 5.959 | 59.6 | 1.38 | 0.25 | 0.60 |
| 6.766 | 60.2 | 0.37 | 0.30 | 0.60 |
| 6.890 | 60.2 | 0.37 | 0.35 | 0.60 |
| 6.890 | 60.2 | 0.37 | 0.35 | 0.60 |
| 7.874 | 60.2 | 0.37 | 0.25 | 0.55 |
| 7.993 | 60.2 | 0.37 | 0.30 | 0.55 |
| 8.139 | 60.2 | 0.37 | 0.35 | 0.55 |
| 8.139 | 60.2 | 0.37 | 0.35 | 0.55 |
| 5.201 | 60.2 | 0.37 | 0.35 | 0.65 |
| 6.863 | 60.2 | 0.26 | 0.25 | 0.60 |
| 5.856 | 70.3 | 5.79 | 0.25 | 0.60 |

FIG. 4G

| R1/R3 | TPAR | CBR | RqRPrim.-FAN | RqRSec.-FAN |
|-------|------|------|------|------|
| 5.205 | 70.4 | 6.24 | 0.25 | 0.60 |
| 4.245 | 70.7 | 7.16 | 0.25 | 0.60 |
| 3.483 | 71.2 | 8.29 | 0.25 | 0.60 |
| 6.217 | 71.4 | 4.04 | 0.25 | 0.60 |
| 6.541 | 72.3 | 2.55 | 0.25 | 0.60 |
| 6.913 | 73.0 | 1.38 | 0.25 | 0.60 |
| 7.962 | 73.7 | 0.26 | 0.25 | 0.60 |

FIG. 4H

AIRFLOW MIXER ASSEMBLY FOR A GAS TURBINE ENGINE

CROSS-REFERENCE TO RELATED APPLICATIONS

This application claims the benefit of priority to U.S. Provisional Application Ser. No. 63/505,789 filed Jun. 2, 2023 and is a continuation in part application of U.S. application Ser. No. 17/879,384, filed Aug. 2, 2022. Each of these applications is hereby incorporated by reference in their entirety.

FIELD

The present disclosure relates to an airflow mixer assembly for a gas turbine engine.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIGS. 4A through 4H are tables depicting numerical values showing the relationships between various parameters in accordance with various example embodiments of the present disclosure.

DETAILED DESCRIPTION

Figure 1:
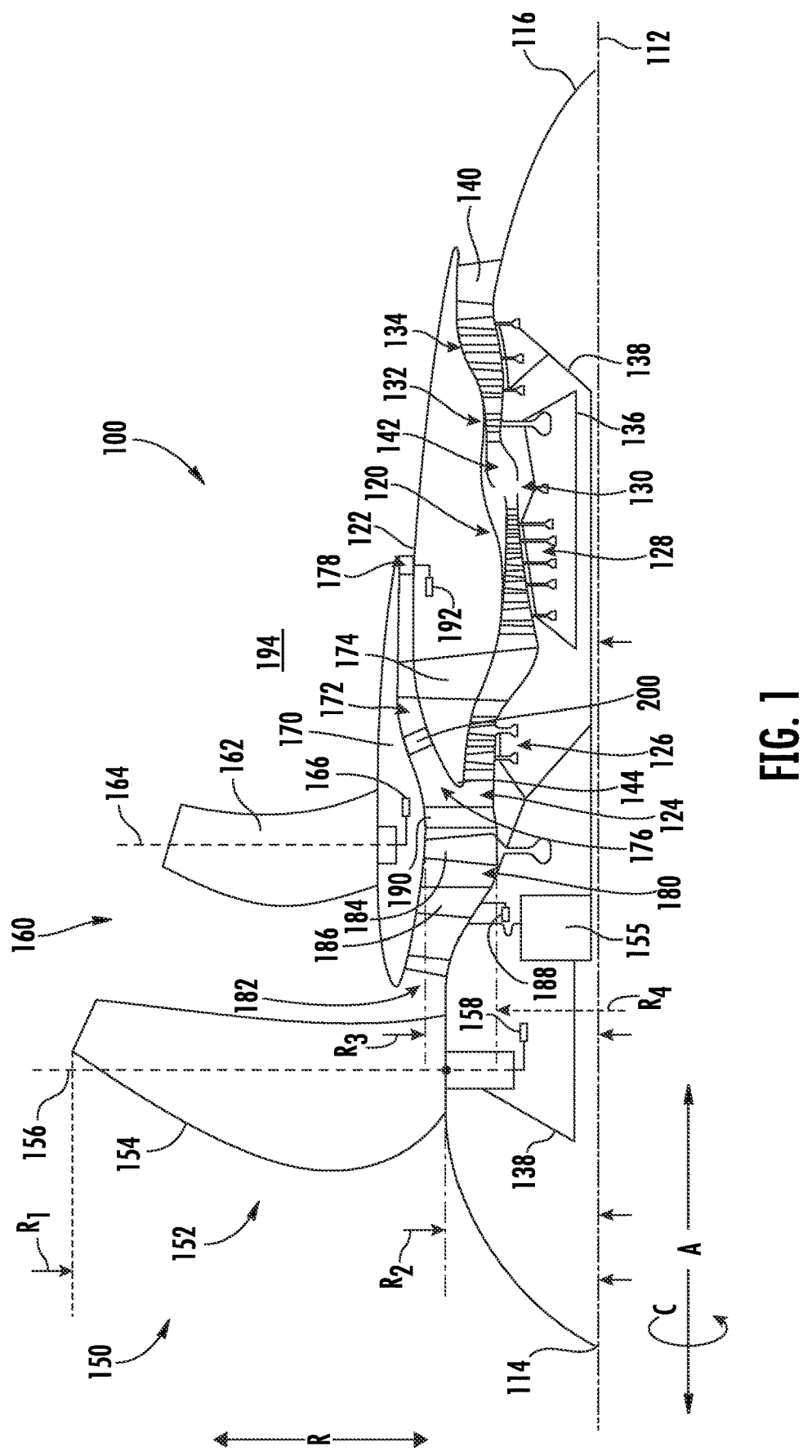
FIG. 1 is a schematic cross-sectional view of a three-stream engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The phrases "from X to Y" and "between X and Y" each refers to a range of values inclusive of the endpoints (i.e., refers to a range of values that includes both X and Y).

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments, an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments, these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "disk loading" refers to an average pressure change across a plurality of rotor blades of a rotor assembly, such as the average pressure change across a plurality of fan blades of a fan.

The term "rated speed" refers to an operating condition of an engine whereby the engine is operating in the maximum, full load operating condition that is rated by the manufacturer.

The term "standard day operating condition" refers to ambient conditions of sea level altitude, 59 degrees Fahrenheit, and 60 percent relative humidity.

The term "propulsive efficiency" refers to an efficiency with which the energy contained in an engine's fuel is converted into kinetic energy for the vehicle incorporating the engine, to accelerate it, or to replace losses due to aerodynamic drag or gravity.

Generally, a gas turbine engine includes a fan to provide a desired amount of thrust without overloading the fan blades (i.e., without increasing a disk loading of the fan blades of the fan beyond a certain threshold), and therefore to maintain a desired overall propulsive efficiency for the gas turbine engine. Conventional gas turbine engine design practice has been to provide an outer nacelle surrounding the fan to provide relatively efficient thrust for the gas turbine engine. Such a configuration may generally limit a permissible size of the fan (i.e., a diameter of the fan). However, the inventors of the present disclosure have found that gas turbine engine design is now driving the diameter of the fan higher to provide as much thrust for the gas turbine engine as possible from the fan to improve an overall propulsive efficiency of the gas turbine engine.

By increasing the fan diameter, an installation of the gas turbine engine becomes more difficult. In addition, if an outer nacelle is maintained, the outer nacelle may become weight prohibitive with some larger diameter fans. Further, as the need for gas turbine engines to provide more thrust continues, the thermal demands on the gas turbine engines correspondingly increases.

The inventors of the present disclosure found that for a three stream gas turbine engine having a primary fan and a secondary fan, with the secondary fan being a ducted fan providing an airflow to a third stream of the gas turbine engine, an overall propulsive efficiency of the gas turbine engine that results from providing a high diameter fan may be maintained at a high level, while reducing the size of the primary fan. Such a configuration may maintain a desired overall propulsive efficiency for the gas turbine engine, or unexpectedly may in fact increase the overall propulsive efficiency of the gas turbine engine.

The inventors proceeded in the manner of designing a gas turbine engine with given primary fan characteristics, secondary fan characteristics, and turbomachine characteristics; checking the propulsive efficiency of the designed gas turbine engine; redesigning the gas turbine engine with varying primary fan, secondary fan, and turbomachine characteristics; rechecking the propulsive efficiency of the redesigned gas turbine engine; etc., during the design of several different types of gas turbine engines, including the gas turbine engines described below with reference to FIGS. 1 and 6 through 10. During the course of this practice of studying/evaluating various primary fan characteristics, secondary fan characteristics, and turbomachine characteristics considered feasible for best satisfying mission requirements, it was discovered that certain relationships exist between a ratio of an airflow through the bypass passage and the third stream to an airflow through a core duct (referred to hereinbelow as a thrust to power airflow ratio), as well as between a ratio of an airflow through the third steam to the airflow through the core duct (referred to hereinbelow as a core bypass ratio). In particular, the inventors of the present disclosure have found that these ratios can be thought of as an indicator of the ability of a gas turbine engine to maintain or even improve upon a desired propulsive efficiency via the third stream and, additionally, indicating an improvement in the gas turbine engine's packaging concerns and weight concerns, and thermal management capabilities.

Referring now to FIG. 1, a schematic cross-sectional view of a gas turbine engine 100 is provided according to an example embodiment of the present disclosure. Particularly, FIG. 1 provides a gas turbine engine having a rotor assembly with a single stage of unducted rotor blades. In such a manner, the rotor assembly may be referred to herein as an "unducted fan," or the entire engine 100 may be referred to as an "open rotor gas turbine engine." In addition, the engine 100 of FIG. 1 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. As will be appreciated, the high pressure compressor 128, the combustor 130, and the high pressure turbine 132 may collectively be referred to as the "core" of the engine 100. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Further, each fan blade 154 defines a fan blade tip radius $R_1$ along the radial direction R from the longitudinal axis 112 to the tip, and a hub radius (or inner radius) $R_2$ along the radial direction R from the longitudinal axis 112 to the base of each fan blade 154 (i.e., from the longitudinal axis 112 to a radial location where each fan blade 154 meets a front hub of the gas turbine engine 100 at a leading edge of the respective fan blade 154). As will be appreciated, a distance from the base of each fan blade 154 to a tip of the respective fan blade 154 is referred to as a span of the respective fan blade 154. Further, the fan 152, or rather each fan blade 154 of the fan 152, defines a fan radius ratio, RqR, equal to $R_1$ divided by $R_2$. As the fan 152 is the primary fan of the engine 100, the fan radius ratio, RqR, of the fan 152 may be referred to as the primary fan radius ratio, $RqR_{Prim.-Fan}$.

Moreover, each fan blade 154 defines a central blade axis 156. For this embodiment, each fan blade 154 of the fan 152 is rotatable about their respective central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1; see fan blades 185 labeled in FIG. 2) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween. Further, each fan blade of the ducted fan 184 defines a fan blade tip radius $R_3$ along the radial direction R from the longitudinal axis 112 to the tip, and a hub radius (or inner radius) $R_4$ along the radial direction R from the longitudinal axis 112 to the base of the respective fan blades of the ducted fan 184 (i.e., a location where the respective fan blades of the ducted fan 184 meet an inner flowpath liner at a leading edge of the respective fan blades of the ducted fan 184). As will be appreciated, a distance from the base of each fan blade of the ducted fan 184 to a tip of the respective fan blade is referred to as a span of the respective fan blade. Further, the ducted fan 184, or rather each fan blade of the ducted fan 184, defines a fan radius ratio, RqR, equal to $R_3$ divided by $R_4$. As the ducted fan 184 is the secondary fan of the engine 100, the fan radius ratio, RqR, of the ducted fan 184 may be referred to as the secondary fan radius ratio, $RqR_{Sec.-Fan}$.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. The inlet duct 180 is wider than the core duct 142 along the radial direction R. The inlet duct 180 is also wider than the fan duct 172 along the radial direction R. The secondary fan 184 is positioned at least partially in the inlet duct 180.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 200 may be positioned in thermal communication with the fan duct 172. For example, one or more heat exchangers 200 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 200 may be an annular heat exchanger extending substantially 360 degrees in the fan duct 172 (meaning that the heat exchanger extends at least 300 degrees, such as at least 330 degrees). In such a manner, the heat exchanger 200 may effectively utilize the air passing through the fan duct 172 to cool one or more systems of the engine 100 (e.g., lubrication oil systems, compressor bleed air, electrical components, etc.). The heat exchanger 200 uses the air passing through duct 172 as a heat sink and correspondingly increases the temperature of the air downstream of the heat exchanger 200 and exiting the fan exhaust nozzle 178.

Figure 2:
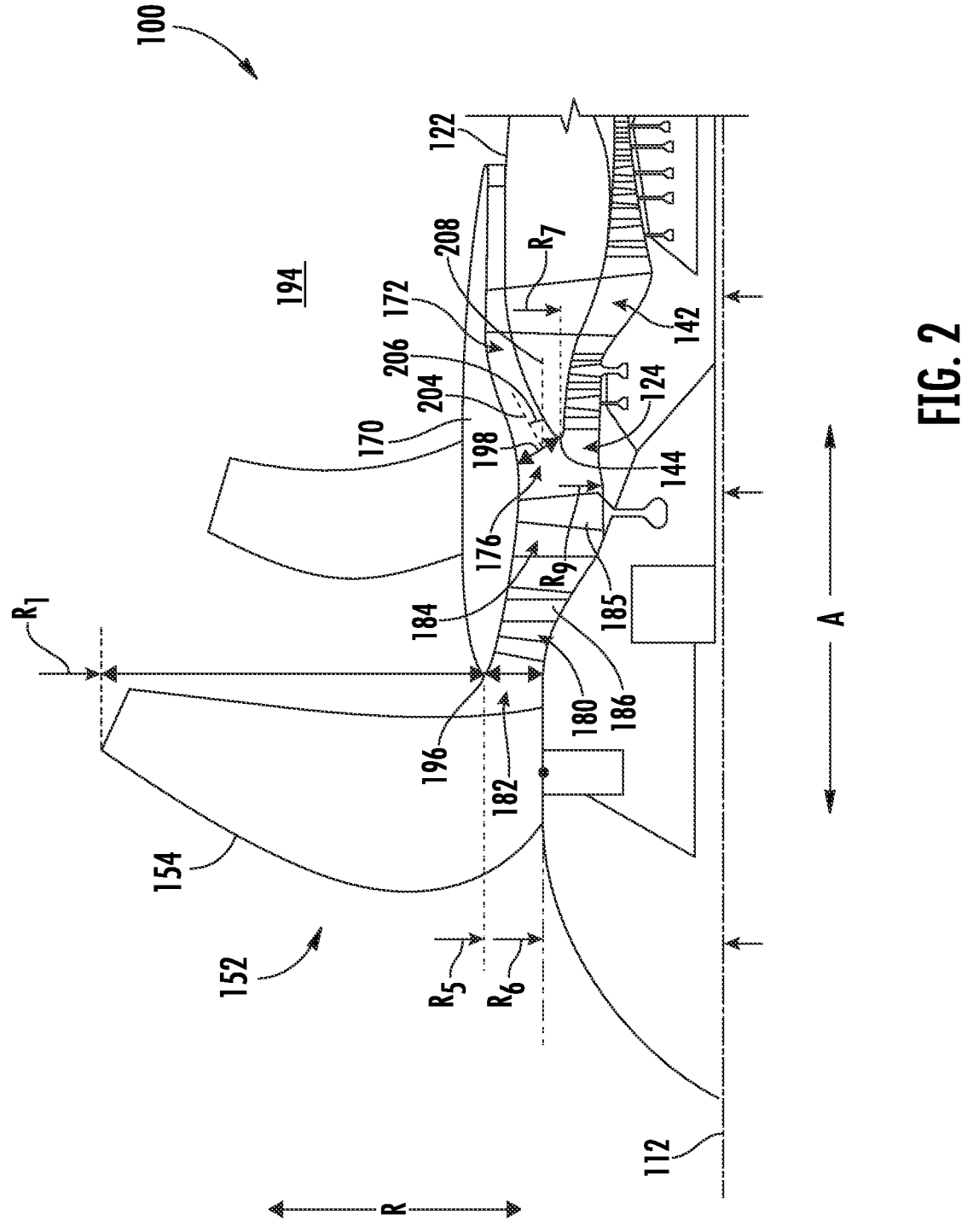
FIG. 2 is a close-up, schematic view of the exemplary three-stream engine of FIG. 1.

Referring now to FIG. 2, a close-up, simplified, schematic view of the gas turbine engine 100 of FIG. 1 is provided. The gas turbine engine 100, as noted above, includes a primary fan, or rather fan 152 having fan blades 154, and a secondary fan, or rather ducted fan 184 having fan blades 185. Airflow from the fan 152 is split between a bypass passage 194 and the inlet duct 180 by an inlet splitter 196. Airflow from the ducted fan 184 is split between the fan duct 172 and the core duct 142 by the leading edge 144 (sometimes also referred to as a fan duct splitter).

The exemplary gas turbine engine 100 depicted in FIG. 2 further defines a primary fan outer fan area, $A_{P\_Out}$, a primary fan inner fan area, $A_{P\_In}$, a secondary fan outer fan area, $A_{S\_Out}$, and a secondary fan inner fan area, $A_{S\_In}$.

The primary fan outer fan area, $A_{P\_Out}$, refers to an area defined by an annulus representing a portion of the fan 152 located outward of the inlet splitter 196 of the fan cowl 170. In particular, the gas turbine engine 100 further defines a fan cowl splitter radius, $R_5$. The fan cowl splitter radius, $R_5$, is defined along the radial direction R from the longitudinal axis 112 to the inlet splitter 196. The primary fan outer fan area, $A_{P\_Out}$, refers to an area defined by the formula: $\pi R_1^2 - \pi R_5^2$.

The primary fan inner fan area, $A_{P\_In}$, refers to an area defined by an annulus representing a portion of the fan 152 located inward of the inlet splitter 196 of the fan cowl 170. In particular, the gas turbine engine 100 further defines an engine inlet inner radius, $R_6$. The engine inlet inner radius, $R_6$, is defined along the radial direction R from the longitudinal axis 112 to an inner casing defining the engine inlet 182 directly inward along the radial direction R from the inlet splitter 196. The primary fan inner fan area, $A_{P\_In}$, refers to an area defined by the formula: $\pi R_5^2 - \pi R_6^2$.

The secondary fan outer fan area, $A_{S\_Out}$, refers to an area representing a portion of an airflow from the ducted fan 184 that is provided to the fan duct 172. In particular, the leading edge 144 defines a leading edge radius, $R_7$, and the gas turbine engine 100 defines an effective fan duct inlet outer radius, $R_5$ (see FIG. 3). The leading edge radius, $R_7$, is defined along the radial direction R from the longitudinal axis 112 to the leading edge 144.

Figure 3:
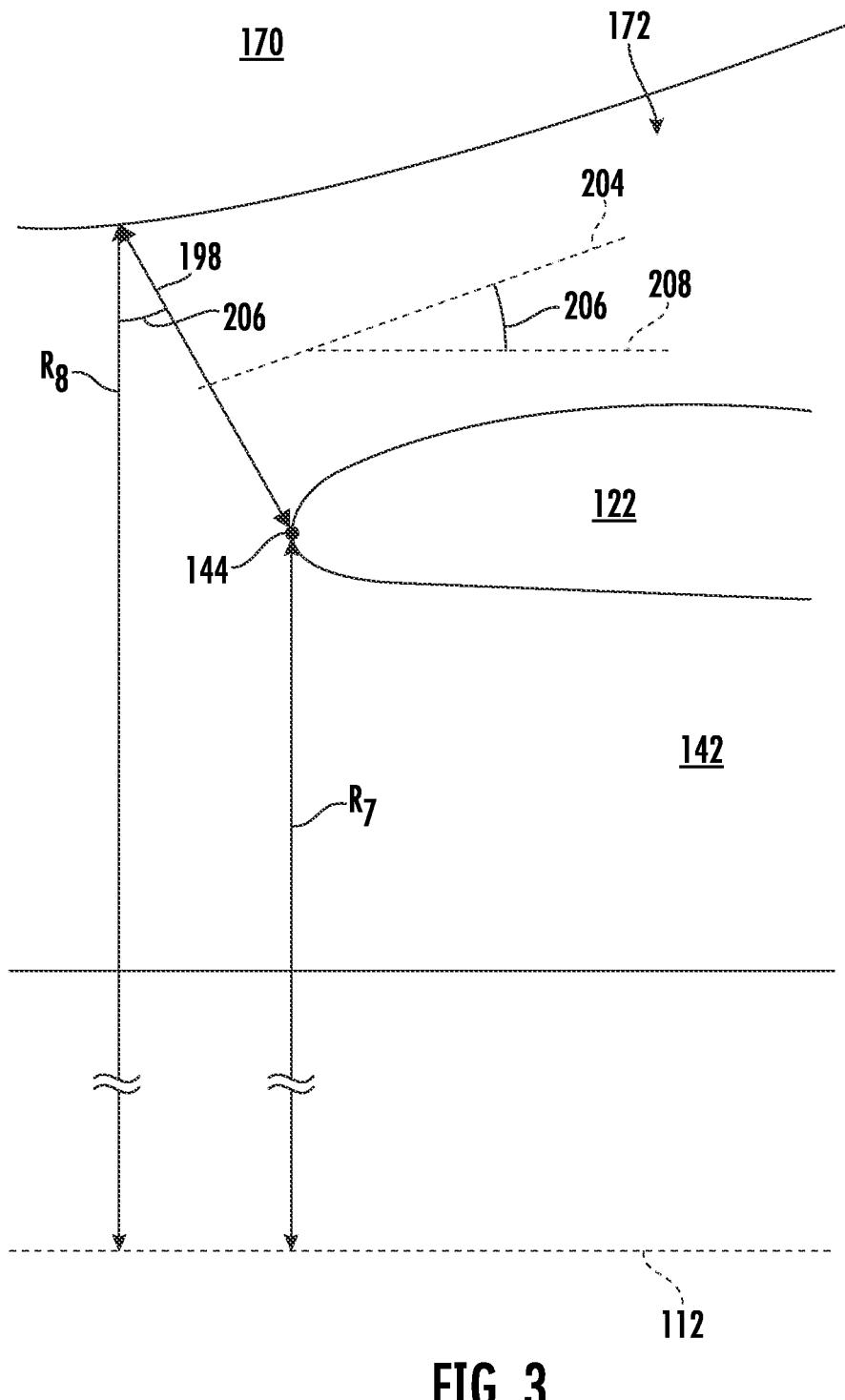
FIG. 3 is a close-up view of an area surrounding a leading edge of a core cowl of the exemplary three-stream engine of FIG. 2.

Referring briefly to FIG. 3, providing a close-up view of an area surrounding the leading edge 144, the fan duct 172 defines a cross-wise height 198 measured from the leading edge 144 to the fan cowl 170 in a direction perpendicular to a mean flow direction 204 of an airflow through a forward 10% of the fan duct 172. An angle 206 is defined by the mean flow direction 204 relative to a reference line 208 extending parallel to the longitudinal axis 112. The angle 206 is referred to as θ. In certain embodiments, the angle 206 may be between 5 degrees and 80 degrees, such as between 10 degrees and 60 degrees (an increased angle is a counterclockwise rotation in FIG. 3). The effective fan duct inlet outer radius, $R_5$, is defined along the radial direction R from the longitudinal axis 112 to where the cross-wise height 198 meets the fan cowl 170. The secondary fan outer fan area, $A_{S\_Out}$, refers to an area defined by the formula:

$$\frac{\pi\left(R_8^2 - R_7^2\right)}{\cos(\theta)}.$$

Referring back to FIG. 2, the secondary fan inner fan area, $A_{S\_In}$, refers to an area defined by an annulus representing a portion of the ducted fan 184 located inward of the leading edge 144 of the core cowl 122. In particular, the gas turbine engine 100 further defines a core inlet inner radius, $R_9$. The core inlet inner radius, $R_9$, is defined along the radial direction R from the longitudinal axis 112 to an inner casing defining the core inlet 124 directly inward along the radial direction R from the leading edge 144. The secondary fan inner fan area, $A_{S\_In}$, refers to an area defined by the formula:

$$formula : \pi R_7^2 - \pi R_9^2.$$

The primary fan outer fan area, $A_{P\_Out}$, the primary fan inner fan area, $A_{P\_In}$, the secondary fan outer fan area, $A_{S\_Out}$, and the secondary fan inner fan area, $A_{S\_In}$, may be used in defining various airflow ratios for the engine 100. In particular, it will be appreciated that the exemplary engine 100 of FIGS. 1 through 3 further defines a thrust to power airflow ratio and a core bypass ratio, which as discussed herein are used to define an engine in accordance with the present disclosure. The thrust to power airflow ratio is a ratio of an airflow through the bypass passage 194 of the engine 100 and through the fan duct 172 to an airflow through the core duct 142. Further, the core bypass ratio is a ratio of an airflow through the fan duct 172 to the airflow through the core duct 142. These ratios are calculated while the engine 100 is operating at a rated speed during standard day operating conditions, and the amounts of airflow used to calculate these ratios are each expressed as a mass flowrate in the same units (mass per unit time).

More specifically, the amount of the airflow through the bypass passage 194 is determined using a fan pressure ratio for the fan 152 while operating at the rated speed during standard day operating conditions, and the primary fan outer fan area, $A_{P\_Out}$. The amount of airflow through the inlet duct 180 is determined using a fan pressure ratio for the fan 152 while operating at a rated speed during standard day operating conditions, and the primary fan inner fan area, $A_{P\_In}$. The amount of airflow through the fan duct 172 and the amount of airflow through the core duct 142 is determined based on the amount of airflow through the inlet duct 180 and the secondary fan outer fan area, $A_{S\_Out}$, and the secondary fan inner fan area, $A_{S\_In}$.

As alluded to earlier, the inventors discovered, unexpectedly during the course of gas turbine engine design—i.e., designing gas turbine engines (e.g., turbofan engines, open rotor gas turbine engines, and turboprop engines) having a variety of different primary fan and secondary fan characteristics—and evaluating an overall propulsive efficiency, significant relationships exist in a ratio of an airflow through a bypass passage and through a third stream to an airflow through a core duct (referred to herein as a thrust to power airflow ratio), as well as in a ratio of an airflow through the third steam to the airflow through the core duct (referred to herein as a core bypass ratio). These relationships can be thought of as an indicator of the ability of a gas turbine engine to maintain or even improve upon a desired propulsive efficiency via the third stream and, additionally, indicating an improvement in the gas turbine engine's packaging concerns and weight concerns, and thermal management capabilities.

As will be appreciated, it may generally be desirable to increase a fan diameter in order to provide a higher thrust to power airflow ratio, which typically correlates to a higher overall propulsive efficiency. However, increasing the fan diameter too much may actually result in a decrease in propulsive efficiency at higher speeds due to a drag from the fan blades. Further, increasing the fan diameter too much may also create prohibitively heavy fan blades, creating installation problems due to the resulting forces on the supporting structure (e.g., frames, pylons, etc.), exacerbated by a need to space the engine having such fan blades further from a mounting location on the aircraft to allow the engine to fit, e.g., under/over the wing, adjacent to the fuselage, etc.

Similarly, it may generally be desirable to increase an airflow through the fan duct relative to the core duct in order to provide a higher core bypass ratio, as such may also generally correlate to a higher overall propulsive efficiency. Notably, however, the higher the core bypass ratio, the less airflow provided to the core of the gas turbine engine. For a given amount of power needed to drive, e.g., a primary fan and a secondary fan of the gas turbine engine, if less airflow is provided, either a maximum temperature of the core needs to be increased or a size of the primary fan or secondary fan needs to be decreased. Such a result can lead to either premature wear of the core or a reduction in propulsive efficiency of the gas turbine engine.

As noted above, the inventors of the present disclosure discovered bounding the relationships defined by the thrust to power airflow ratio and core bypass ratio can result in a gas turbine engine maintaining or even improving upon a desired propulsive efficiency, while also taking into account the gas turbine engine's packaging concerns and weight concerns, and also providing desired thermal management capabilities. The relationship discovered, infra, can identify an improved engine configuration suited for a particular mission requirement, one that takes into account installation, packaging and loading, thermal sink needs and other factors influencing the optimal choice for an engine configuration.

In addition to yielding an improved gas turbine engine, as explained in detail above, utilizing this relationship, the inventors found that the number of suitable or feasible gas turbine engine designs incorporating a primary fan and a secondary fan, and defining a third stream, capable of meeting both the propulsive efficiency requirements and packaging, weight, and thermal sink requirements could be greatly diminished, which facilitates a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

The desired relationships providing for the improved gas turbine engine, discovered by the inventors, are expressed as:

$$TPAR = (A_B + A_{3S})/A_C, \qquad (1)$$

$$CBR = A_{3S}/A_C, \qquad (2)$$

where TPAR is a thrust to power airflow ratio, CBR is a core bypass ratio, $A_B$ is an airflow through a bypass passage of the gas turbine engine while the engine is operated at a rated speed during standard day operating conditions, $A_{3S}$ is an airflow through a third stream of the gas turbine engine while the engine is operated at the rated speed during standard day operating conditions, and $A_C$ is an airflow through a core of the gas turbine engine while the engine is operated at the rated speed during standard day operating conditions. The airflow through the core of the gas turbine engine may refer to an airflow through an upstream end of the core (e.g., an airflow through a first stage of a high pressure compressor of the core). $A_B$, $A_{3S}$, and $A_C$ are each expressed as mass flowrate, with the same units as one another.

Values for various parameters of the influencing characteristics of an engine defined by Expressions (1) and (2) are set forth below in TABLE 1:

TABLE 1

| Symbol | Description | Ranges appropriate for using Expression (1) |
|---|---|---|
| $R_1/R_3$ | Tip radius ratio | 1.35 to 10, such as 2 to 7, such as 3 to 5, such as at least 3.5, such as at least 3.7, such as at least 4, such as up to 10, such as up to 7 |
| $RqR_{Sec.-Fan}$ | Secondary fan radius ratio | 0.2 to 0.9, such as 0.2 to 0.7, such as 0.57 to 0.67 |
| $RqR_{Prim.-Fan}$ | Primary fan radius ratio | 0.2 to 0.4, such as 0.25 to 0.35 |
| TPAR | Thrust to power airflow ratio | 3.5 to 100, such as 4 to 75 (see also, TABLE 2, below) |
| CBR | Core Bypass Ratio | 0.1 to 10, such as 0.3 to 5 (see also, TABLE 2, below) |

Figure 5A:
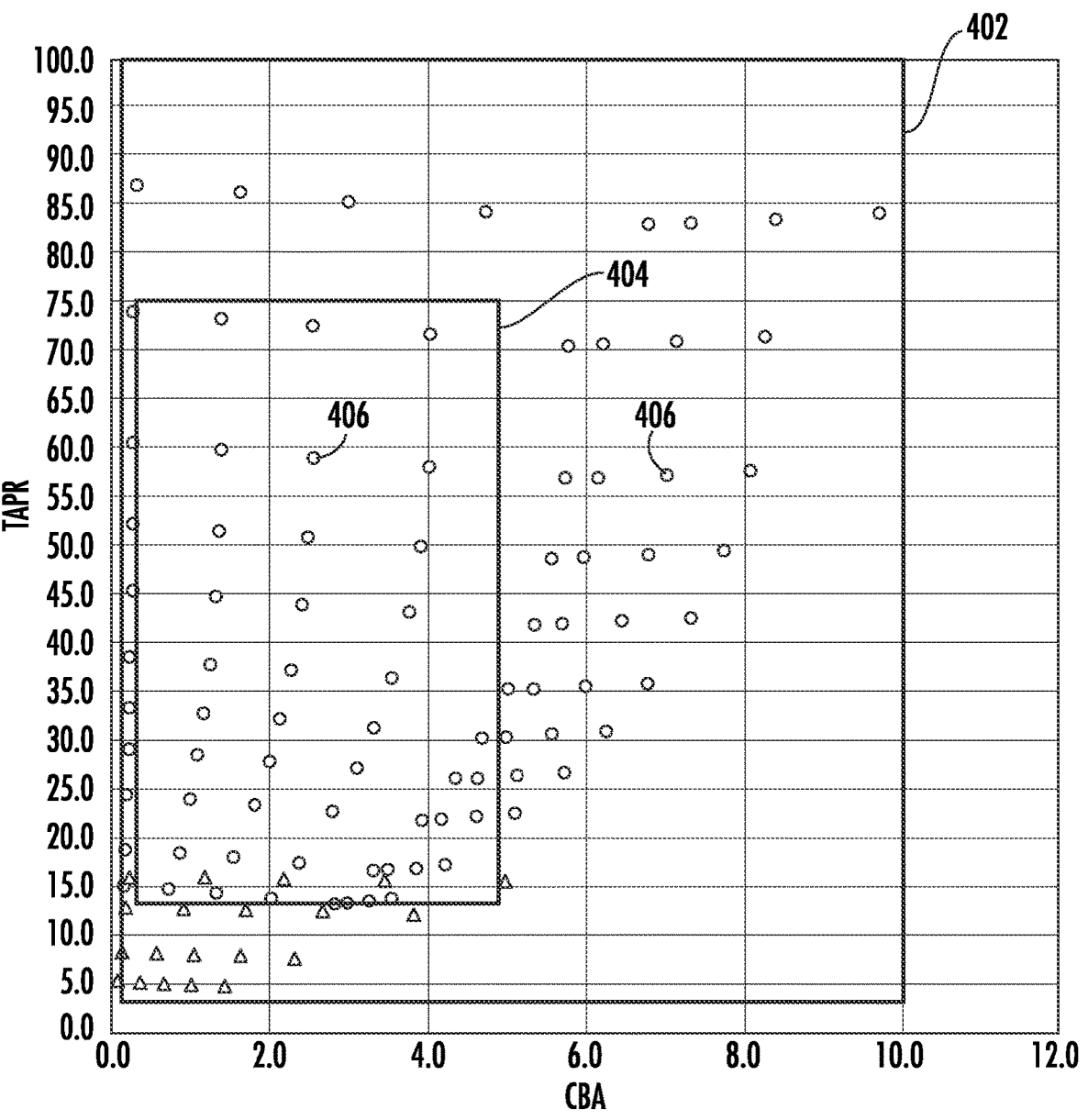
FIGS. 5A through 5D are graphs depicting a range of thrust to power airflow ratios and core bypass ratios in accordance with various example embodiments of the present disclosure.

Referring now to FIGS. 4A through 4H and 5A through 51D, the relationships between the various parameters of Expressions (1) and (2) of exemplary gas turbine engines are illustrated in accordance with one or more exemplary embodiments of the present disclosure. In particular, FIGS. 4A through 4H provide a table including numerical values corresponding to several of the plotted gas turbine engines in FIGS. 5A through SD). FIGS. 5A through SD are plots of gas turbine engines in accordance with one or more exemplary embodiments of the present disclosure, showing the TPAR (Y-Axis) and the CBR (X-axis). FIGS. 5A through SD highlight preferred subranges, including subranges for unducted engines, ducted engines, and turboprop engines, as discussed hereinbelow.

Referring particularly to FIG. 5A, a first range 402 and a second range 404 are provided, and exemplary embodiments 406 are plotted. The exemplary embodiments 406 include a variety of gas turbine engine types in accordance with aspects of the present disclosure, including open rotor gas turbine engines, turbofan engines, and turboprop engines. The first range 402 corresponds to a TPAR between 3.5 and 100 and a CBR between 0.1 and 10. The first range 402 captures the benefits of the present disclosure across the variety of engine types. The second range 404 corresponds to a TPAR between 14 and 75 and a CBR between 0.3 and 5. The second range 404 may provide more desirable TPAR and CBR relationships across the variety of engine types to achieve propulsive efficiency, while still providing packaging and weight benefits, thermal benefits, etc.

Figure 5B:
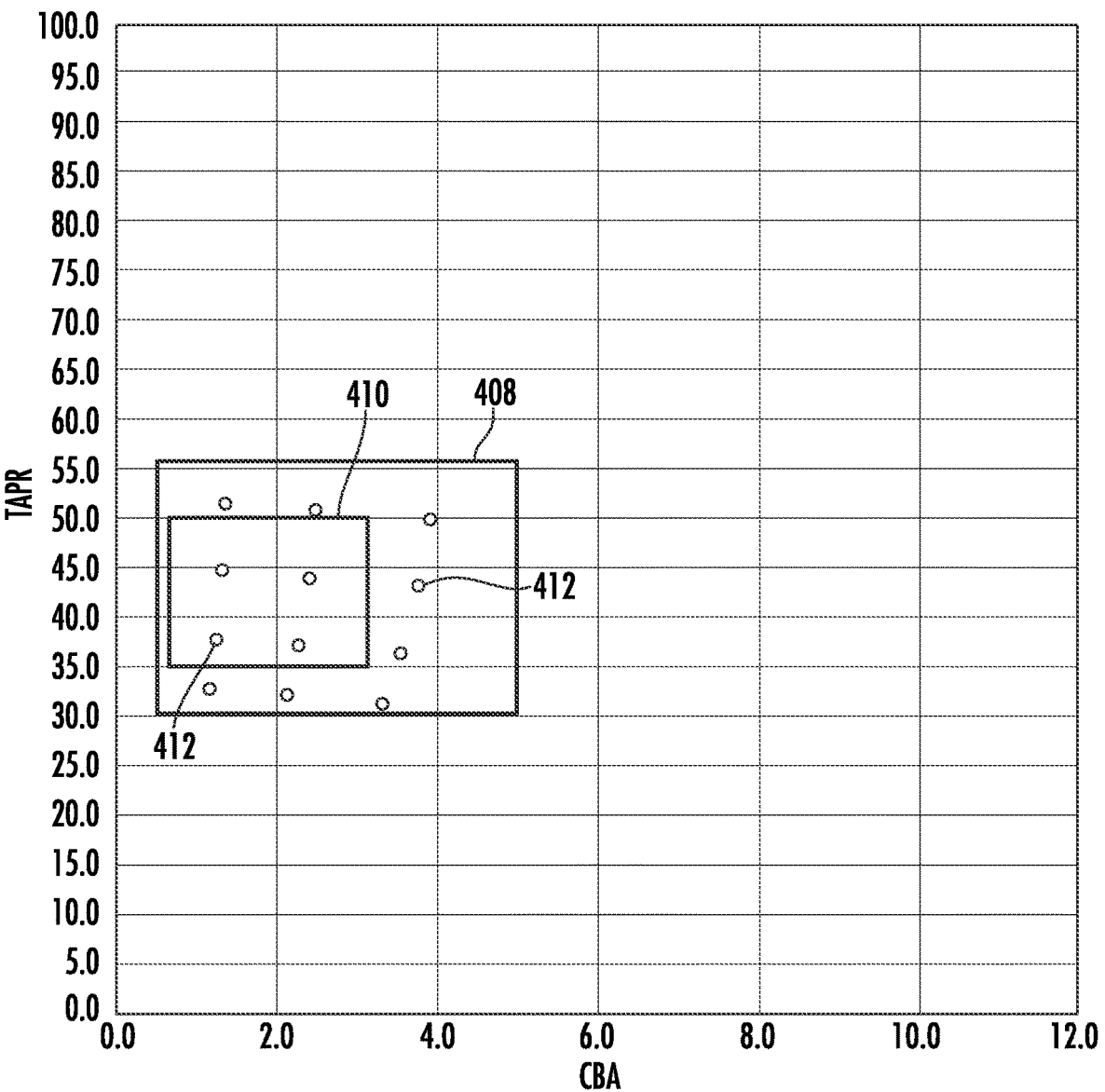

Referring particularly to FIG. 5B, a third range 408 and a fourth range 410 are provided, and exemplary embodiments 412 are plotted. The exemplary embodiments 412 include a variety of open rotor gas turbine engines in accordance with aspects of the present disclosure. In particular, the exemplary embodiments 412 include a variety of gas turbine engines having an unducted primary fan, similar to the exemplary embodiments described herein with reference to FIGS. 1 and 10. The third range 408 corresponds to a TPAR between 30 and 56 and a CBR between 0.3 and 5. The third range 408 captures the benefits of the present disclosure for open rotor gas turbine engines. The fourth range 410 corresponds to a TPAR between 35 and 50 and a CBR between 0.5 and 3. The fourth range 410 may provide more desirable TPAR and CBR relationships for the open rotor gas turbine engines to achieve propulsive efficiency, while still providing packaging and weight benefits, thermal benefits, etc.

As will be appreciated, the open rotor gas turbine engines may have, on the whole, a higher TPAR as compared to the ducted gas turbine engines (see FIG. 5C), enabled by a lack of an outer nacelle or other casing surrounding a primary fan. The range of CBR values in the fourth range 410 is not as large as the range of CBR values in the third range 408, as in the embodiments with a higher TPAR, the CBR needs to be lower to provide a necessary amount of airflow to a core of the engine without exceeding temperature thresholds or requiring an undesired reduction in a size of the primary fan.

The inventors of the present disclosure have found that the TPAR values and CBR values in the third and fourth ranges 408, 410 shown may provide a desirable propulsive benefit, while still enabling operation of the core in a reasonable manner, and balancing installation and thermal load considerations.

Figure 5C:
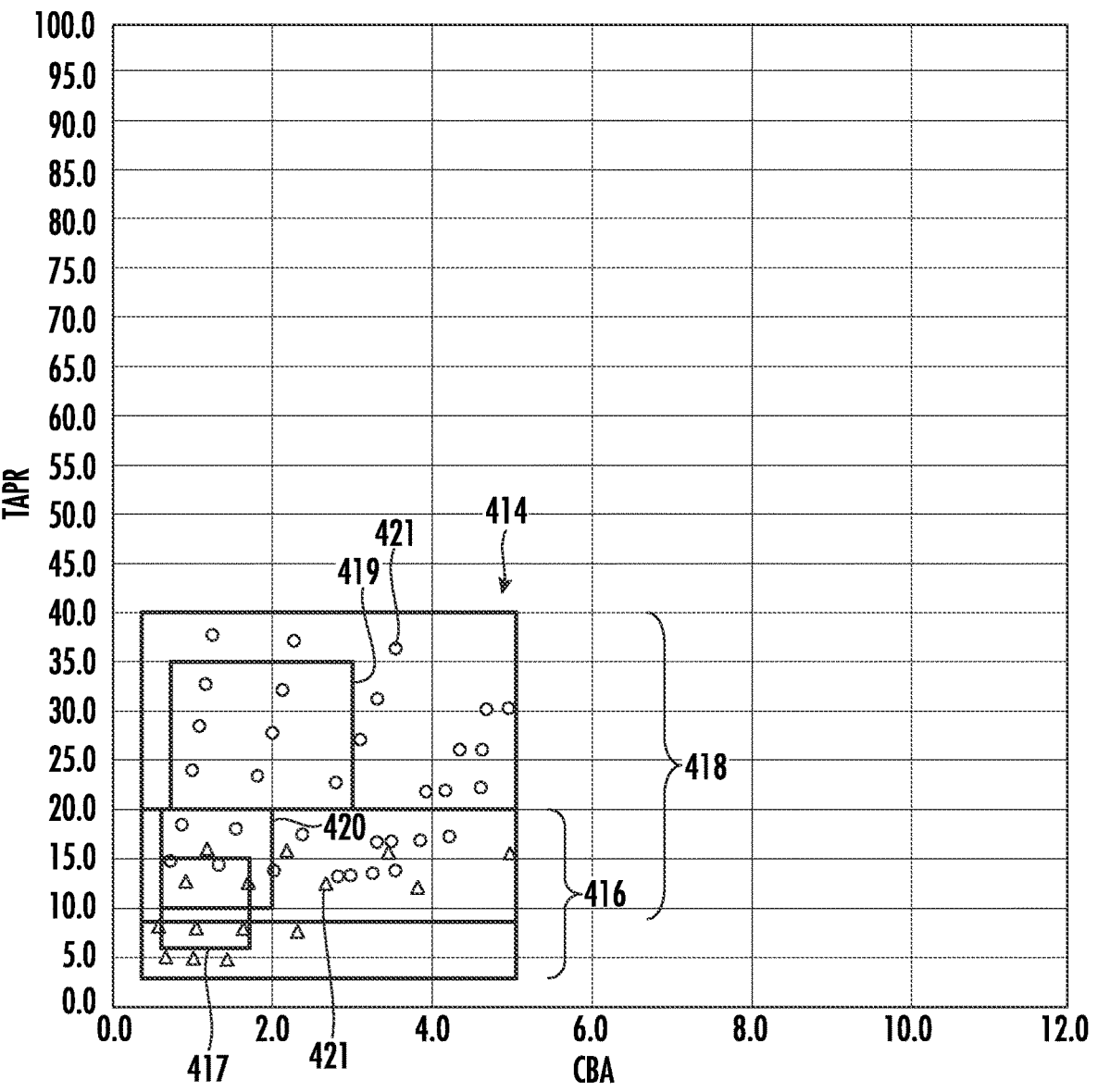

Referring particularly to FIG. 5C, a fifth range 414, a sixth range 416, a seventh range 417, an eighth range 418, a ninth range 419, and a tenth range 420 are provided, and exemplary embodiments 421 are plotted. The exemplary embodiments 421 include a variety of ducted gas turbine engines in accordance with aspects of the present disclosure. In particular, the exemplary embodiments 421 include a variety of gas turbine engines having a ducted primary fan, similar to the exemplary embodiments described herein with reference to FIGS. 7 through 9. The fifth range 414 corresponds to a TPAR between 3.5 and 40 and a CBR between 0.3 and 5. The fifth range 414 captures the benefits of the present disclosure for ducted gas turbine engines.

The sixth range 416 corresponds to a TPAR between 3.5 and 20 and a CBR between 0.2 and 5. The sixth range 416 captures the benefits of the present disclosure for ducted gas turbine engines in a direct drive configuration (see, e.g., FIG. 7). As will be appreciated, with a ducted, direct drive gas turbine engine a primary fan may be smaller, limiting a TPAR. The seventh range 417, which also corresponds to ducted gas turbine engines in a direct drive configuration, corresponds to a TPAR between 6 and 15 and a CBR between 0.3 and 1.8, and may represent a more preferable range.

The eighth range 418 corresponds to a TPAR between 8 and 40 and a CBR between 0.2 and 5. The eighth range 418 captures the benefits of the present disclosure for ducted gas turbine engines in a geared configuration (see, e.g., FIGS. 8 and 9). As will be appreciated, with a ducted, geared gas turbine engine a primary fan may be larger as compared to a ducted, direct drive gas turbine engine, allowing for a larger TPAR. TPAR is, in turn limited by an allowable nacelle drag and fan operability.

The ninth range 419 corresponds to ducted gas turbine engines in a geared configuration having a variable pitch primary fan (see FIGS. 8 and 9) and the tenth range 420 corresponds to ducted gas turbine engines in a geared configuration having a fixed pitch primary fan. Inclusion of a variable pitch primary fan may allow for a larger fan, but may also necessitate higher heat rejection abilities for the gas turbine engine, which may, in turn increase a CBR. The ninth range 419 corresponds to a TPAR between 20 and 35 and a CBR between 0.5 and 3, and the tenth range 420 corresponds to a TPAR between 10 and 20 and a CBR between 0.3 and 2. It will be appreciated that in other exemplary aspects, a gas turbine engine of the present disclosure in a ducted, geared, variable pitch configuration may have TPAR between 15 and 40 and a CBR between 0.3 and 5, and a gas turbine engine in a ducted, geared, fixed pitch configuration may have TPAR between 8 and 25 and a CBR between 0.3 and 5.

As will be appreciated, the ducted gas turbine engines may have, on the whole, a lower TPAR than the open rotor gas turbine engines as a result of an outer nacelle surrounding a primary fan (the outer nacelle becoming prohibitively heavy with higher diameter primary fans). Further, it will be appreciated that the TPAR values for geared engines may be higher than the TPAR values for direct drive engines, as inclusion of the gearbox allows the primary fan to rotate more slowly than the driving turbine, enabling a comparatively larger primary fan without overloading the primary fan or generating shock losses at a tip of the primary fan. The range of CBR values may generally be relatively high given the relatively low TPAR values (since a relatively high amount of airflow is provided to a secondary fan through an engine inlet when the TPAR values are low; compare, e.g., the values in FIG. 5D to the values in FIG. 5C), as a necessary amount of airflow to a core of the ducted gas turbine engine may still be provided with a relatively high CBR without exceeding temperature thresholds or requiring a reduction in a size of the primary fan.

The inventors of the present disclosure have found that the TPAR values and CBR values in the fifth, sixth, seventh, eighth, ninth, and tenth ranges 414, 416, 417, 418, 419, 420 shown may provide a desirable propulsive benefit, while still enabling operation of the core in a desired manner to satisfy mission requirement, and balancing installation and thermal load considerations.

Figure 5D:
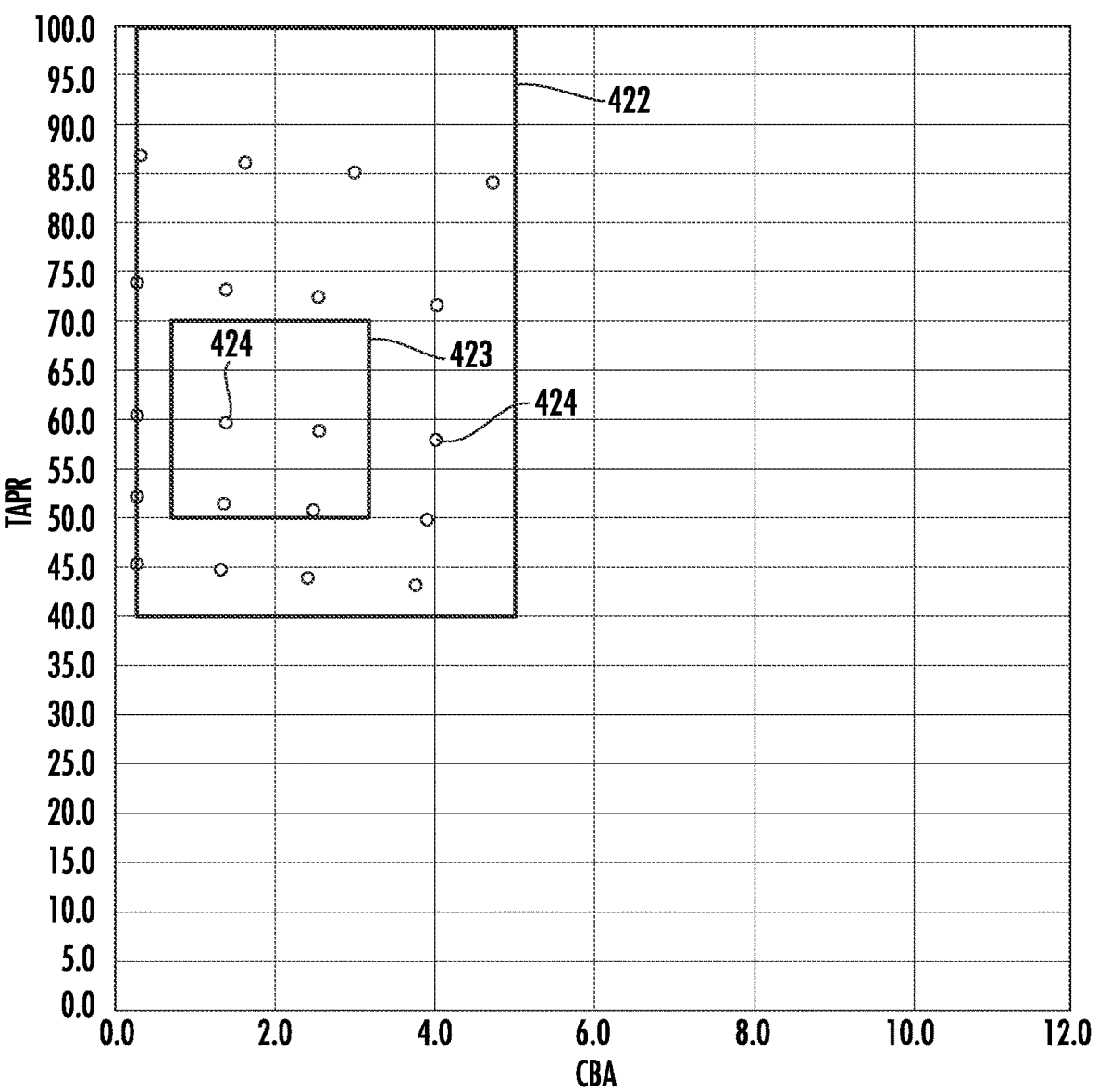

Referring particularly to FIG. 5D, an eleventh range 422 and a twelfth range 423 are provided, and exemplary embodiments 424 are plotted. The exemplary embodiments 424 include a variety of turboprop gas turbine engines in accordance with aspects of the present disclosure. In particular, the exemplary embodiments 424 include a variety of turboprop gas turbine engine similar to the exemplary embodiment described herein with reference to FIG. 6. The eleventh range 422 corresponds to a TPAR between 40 and 100 and a CBR between 0.3 and 5. The eleventh range 422 captures the benefits of the present disclosure for turboprop gas turbine engines. The twelfth range 423 corresponds to a TPAR between 50 and 70 and a CBR between 0.5 and 3, and may represent a more preferable range.

As will be appreciated, the turboprop gas turbine engines may have, on the whole, higher TPAR values than gas turbine engines, enabled by the lack of an outer nacelle or other casing surrounding a primary fan and a relatively slow operational speed of the primary fan and aircraft incorporating the turboprop gas turbine engine. The range of CBR values in the eleventh range 422 and the twelfth range 423 may be relatively small, as less air may be provided through a third stream with such a high TPAR without compromising operation of a core of the gas turbine engine.

The inventors of the present disclosure have found that the TPAR values and CBR values in the eleventh range 422 and twelfth range 423 shown may provide a desirable propulsive benefit, while still enabling operation of the core in a desired manner to satisfy mission requirements, and balancing installation and thermal load considerations.

TABLE 2, below provides a summary of TPAR values and CBR values for various gas turbine engines in accordance with one or more exemplary aspects of the present disclosure.

TABLE 2

| Engine Type | TPAR Value | CBR Value |
| --- | --- | --- |
| All Aeronautical Gas Turbine Engines ("GTE") | 3.5 to 100 | 0.1 to 10 |
| All Aeronautical GTE | 4 to 75 | 0.3 to 5 |
| Open Rotor GTE | 30 to 60 | 0.3 to 5 |
| Open Rotor GTE | 35 to 50 | 0.5 to 3 |
| Ducted Gas GTE | 3.5 to 40 | 0.2 to 5 |
| Ducted, Geared GTE | 8 to 40 | 0.2 to 5 |
| Ducted, Geared, Variable Pitch GTE | 15 to 40 | 0.3 to 5 |
| Ducted, Geared, Variable Pitch GTE | 20 to 35 | 0.5 to 3 |
| Ducted, Geared, Fixed-Pitch GTE | 8 to 25 | 0.2 to 5 |
| Ducted, Geared, Fixed-Pitch GTE | 10 to 20 | 0.3 to 2 |
| Ducted, Direct Drive GTE | 3.5 to 20 | 0.2 to 5 |
| Ducted, Direct Drive GTE (lower flight speed) | 6 to 20 | 0.2 to 5 |
| Ducted, Direct Drive GTE (lower flight speed) | 8 to 15 | 0.3 to 1.8 |
| Ducted, Direct Drive GTE (higher flight speed) | 3.5 to 10 | 0.2 to 2 |
| Ducted, Direct Drive GTE (higher flight speed) | 3.5 to 6 | 0.3 to 1.5 |
| Turboprop GTE | 40 to 100 | 0.3 to 5 |
| Turboprop GTE | 50 to 70 | 0.5 to 3 |

Figure 6:
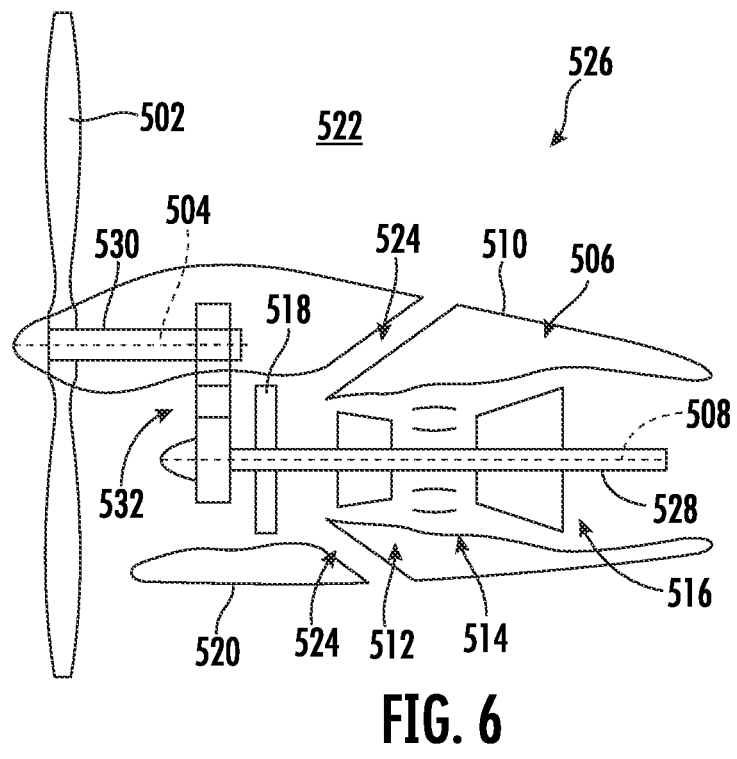
FIG. 6 is a schematic view of a turboprop engine in accordance with an exemplary aspect of the present disclosure.
Figure 7:
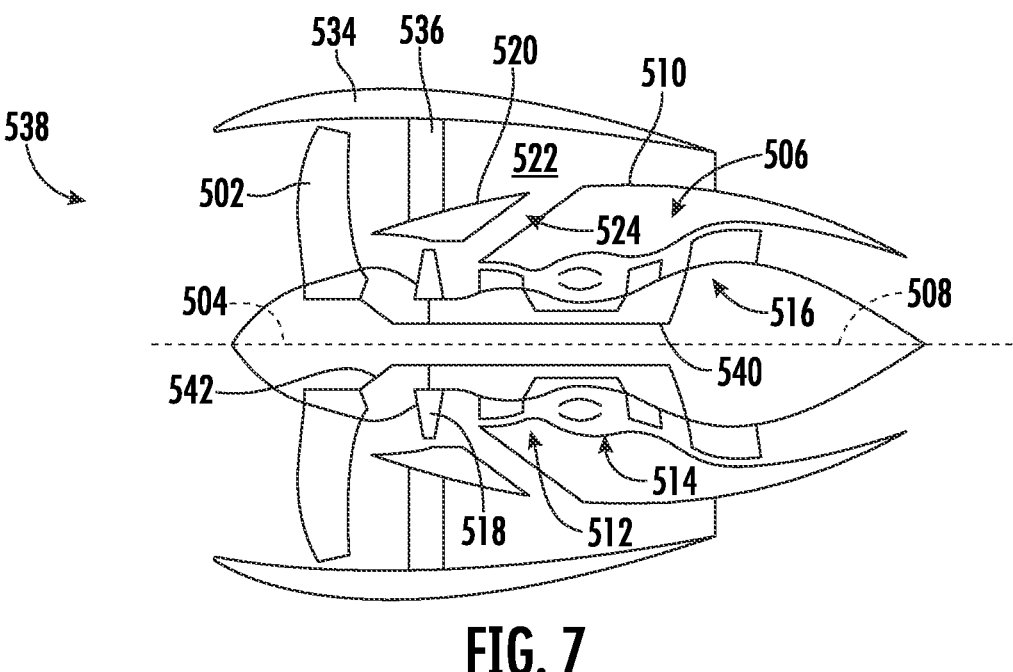
FIG. 7 is a schematic view of a direct drive, ducted, gas turbine engine in accordance with an exemplary aspect of the present disclosure.
Figure 8:
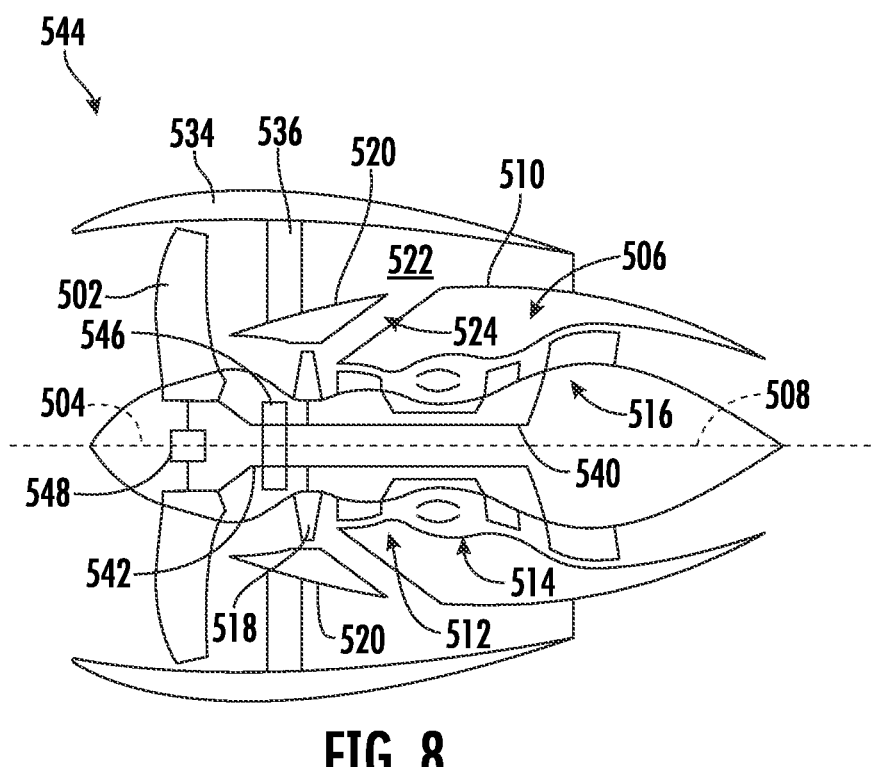
FIG. 8 is a schematic view of a geared, ducted, gas turbine engine in accordance with an exemplary aspect of the present disclosure.
Figure 9:
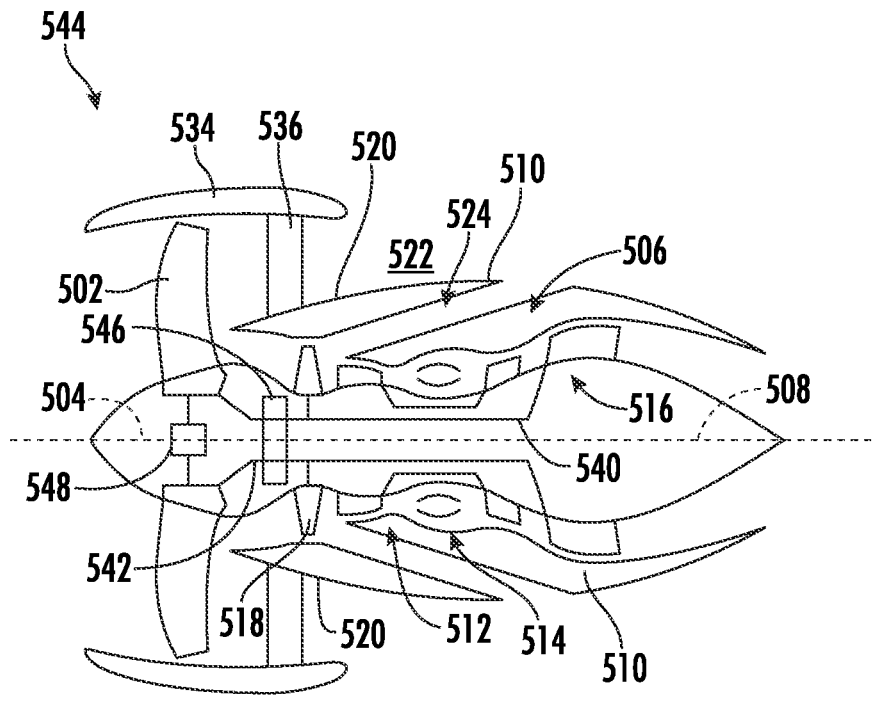
FIG. 9 is a schematic view of a geared, ducted, gas turbine engine in accordance with another exemplary aspect of the present disclosure.

For the purposes of Table 2, the term "Ducted" refers to inclusion of an outer nacelle around a primary fan (see, e.g., FIGS. 7 to 9); "Open Rotor" refers to inclusion of an unducted primary fan (see, e.g., FIGS. 1, 10); "Geared" refers to inclusion of a reduction gearbox between the primary fan and a driving turbine (see, e.g., FIGS. 8 to 10); "Direct Drive" refers to exclusion of a reduction gearbox between the primary fan and a driving turbine (see, e.g., FIG. 7); "Variable Pitch" refers to inclusion of a pitch change mechanism for changing a pitch of fan blades on a primary fan (see, e.g., FIGS. 1, 8, 9); "Fixed Pitch" refers to exclusion of a pitch change mechanism for changing a pitch of fan blades on a primary fan (see, e.g., FIGS. 6 to 7); "lower flight speed" refers to an engine designed to operate at a flight speed less than 0.85 Mach; and "higher flight speed" refers to an engine designed to operate at a flight speed higher than 0.85 Mach.

It will be appreciated that although the discussion above is generally relating to the open rotor engine 100 described above with reference to FIGS. 1 and 2, in various embodiments of the present disclosure, the relationships outlined above with respect to, e.g., Expressions (1) and (2) may be applied to any other suitable engine architecture. For example, reference will now be made to FIGS. 6 through 10, each depicting schematically an engine architecture associated with the present disclosure.

Each of the gas turbine engines of FIGS. 6 through 9 generally include a rotor 502 rotatable about a rotor axis 504 and a turbomachine 506 rotatable about a longitudinal axis 508. The rotor 502 corresponds to the "primary fan" described herein. The turbomachine 506 is surrounded at least in part by a core cowl 510 and includes a compressor section 512, a combustion section 514, and a turbine section 516 in serial flow order. In addition to the rotor 502, the gas turbine engines of FIGS. 7 through 9 each also include a ducted mid-fan or secondary fan 518. The gas turbine engines each include a fan cowl 520 surrounding the secondary fan 518.

Referring still to the gas turbine engines of FIGS. 6 through 9, the gas turbine engines each also define a bypass passage 522 downstream of the respective rotor 502 and over the respective fan cowl 520 and core cowl 510, and further define a third stream 524 extending from a location downstream of the respective secondary fan 518 to the respective bypass passage 522 (at least in the embodiments depicted; in other embodiments, the third stream 524 may instead extend to a location downstream of the bypass passage 522).

Referring particularly to FIG. 6, the exemplary gas turbine engine depicted is configured as a turboprop engine 526. In such a manner, the rotor 502 (or primary fan) is configured as a propeller, defining a relatively large diameter. Further, the turboprop engine 526 includes an engine shaft 528 driven by the turbomachine 506, a fan shaft 530 rotatable with the rotor 502, and a gearbox 532 mechanically coupling the engine shaft 528 with the fan shaft 530. The gearbox 532 is an offset gearbox such that the rotor axis 504 is radially offset from the longitudinal axis 508 of the turboprop engine 526.

Notably, in other embodiments of the present disclosure, a turboprop engine may be provided with a reverse flow combustor.

Referring to FIGS. 7 through 9, the gas turbine engines are each configured as gas turbine engines, and more specifically as ducted gas turbine engines. In such a manner, the gas turbine engines each include an outer nacelle 534 surrounding the rotor 502, and the rotor 502 (or primary fan) of each is therefore configured as a ducted fan. Further, each of the gas turbine engines includes outlet guide vanes 536 extending through the bypass passage 522 to the outer nacelle 534 from the fan cowl 520, the core cowl 510, or both.

More specifically, still, the gas turbine engine of FIG. 7 is configured as a direct drive, ducted, gas turbine engine 538. In particular, the direct drive, ducted, gas turbine engine 538 includes an engine shaft 540 driven by the turbine section 516 and a fan shaft 542 rotatable with the rotor 502. The fan shaft 542 is configured to rotate directly with (i.e., at the same speed as) the engine shaft 540.

By contrast, the gas turbine engine of FIG. 8 is configured as a geared, ducted, gas turbine engine 544. In particular, the geared, ducted, gas turbine engine 544 includes the engine shaft 540 driven by the turbine section 516 and the fan shaft 542 rotatable with the rotor 502. However, the exemplary geared, ducted, gas turbine engine 544 further includes a gearbox 546 mechanically coupling the engine shaft 540 to the fan shaft 542. The gearbox 546 allows the rotor 502 to rotate at a slower speed than the engine shaft 540, and thus at a slower speed than the secondary fan 518.

Notably, the exemplary geared, ducted, gas turbine engine 544 of FIG. 8 further includes a pitch change mechanism 548 operable with the rotor 502 to change a pitch of the rotor blades of the rotor 502. Such may allow for an increased efficiency of the gas turbine engine.

Further, the exemplary gas turbine engine of FIG. 9 is again configured as a direct drive, ducted, gas turbine engine 538. However, by contrast to the embodiment of FIG. 8 where a fan duct outlet defined by the fan duct is upstream of a bypass passage outlet defined by the bypass passage, in the embodiment of FIG. 9, the fan duct outlet defined by the fan duct is downstream of the bypass passage outlet defined by the bypass passage.

Moreover, in other exemplary embodiments, other suitable gas turbine engines may be provided. For example, referring now to FIG. 10, a gas turbine engine in accordance with yet another exemplary embodiment of the present disclosure is provided. The exemplary gas turbine engine of FIG. 10 may be configured in a similar manner as the exemplary gas turbine engines described above with reference to FIGS. 7 and 8.

Figure 10:
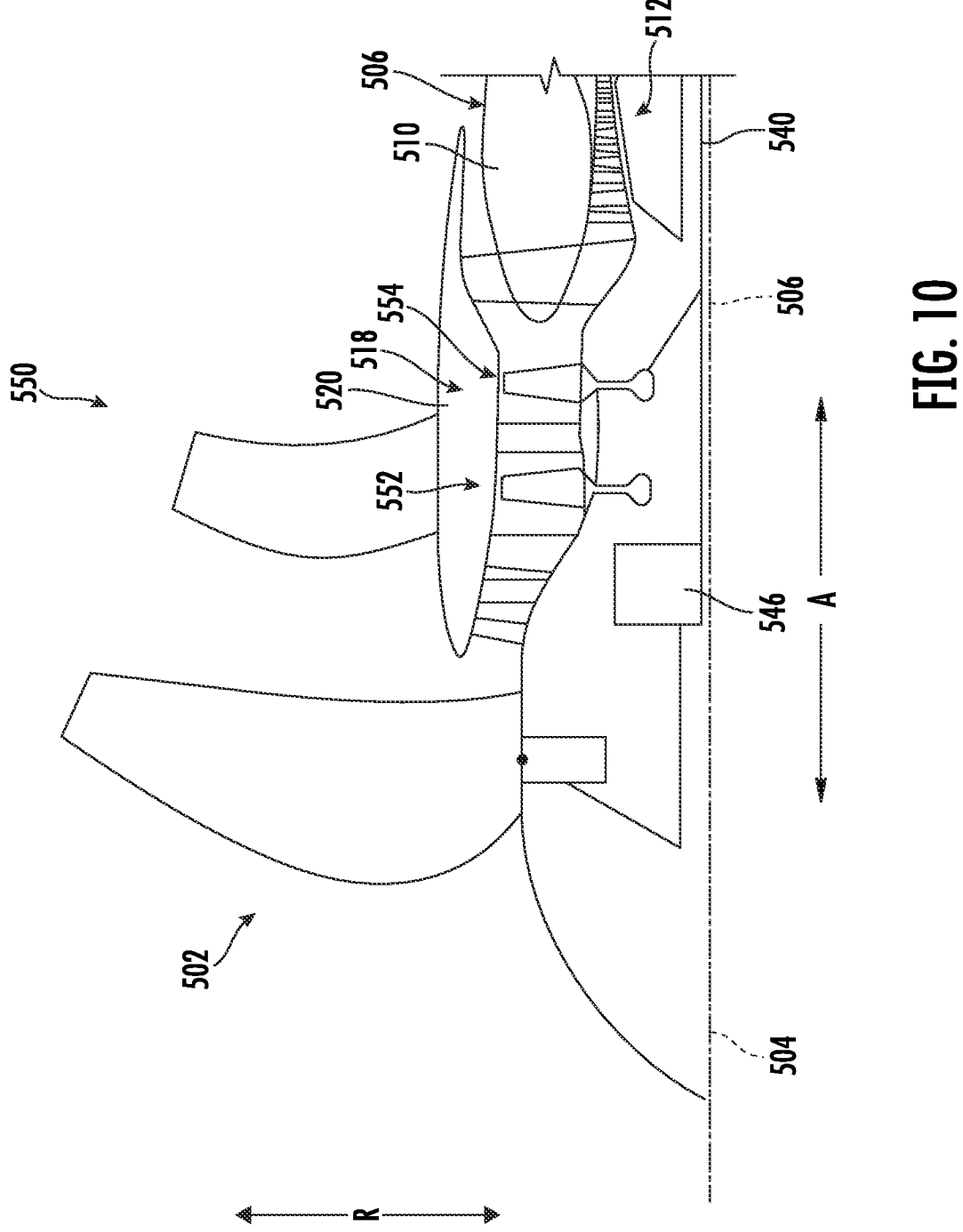
FIG. 10 is a schematic view of an open rotor gas turbine engine in accordance with another exemplary aspect of the present disclosure.

For example, the exemplary gas turbine engine of FIG. 10 includes a rotor 502 rotatable about a rotor axis 504 and a turbomachine 506 rotatable about a longitudinal axis 508. The rotor axis 504 and the longitudinal axis 508 are aligned in the embodiment of FIG. 10. The rotor 502 corresponds to the "primary fan" described herein. The turbomachine 506 is surrounded at least in part by a core cowl 510 and includes a compressor section 512 (and, not shown, a combustion section and a turbine section in serial flow order with the compressor section 512). In addition to the rotor 502, the gas turbine engine also includes a ducted mid-fan or secondary fan 518 and a fan cowl 520 surrounding the secondary fan 518.

However, for the embodiment of FIG. 10, the gas turbine engine is configured as an open rotor gas turbine engine 550 (see, e.g., FIG. 1), and the secondary fan 518 is not configured as a single stage fan (see fan 184 of FIG. 1). Instead, for the embodiment of FIG. 10, the secondary fan 518 is configured as a multi-stage secondary fan, and more specifically still as a two-stage secondary fan having a total of two stages of rotating compressor rotor blades, and more specifically having a first stage 552 of secondary fan rotor blades and a second stage 554 of secondary fan rotor blades. Notably, with such a configuration, the turbomachine 506 does not include a separate low pressure compressor.

Further, it will be appreciated that in at least certain exemplary embodiments of the present disclosure, a method of operating a gas turbine engine is provided. The method may be utilized with one or more of the exemplary gas turbine engines discussed herein, such as in FIGS. 1 through 10. The method includes operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5. For the exemplary method, the thrust to power airflow ratio is a ratio of an airflow through a bypass passage over a turbomachine of the gas turbine engine plus an airflow through a fan duct to an airflow through a core duct, and the core bypass ratio is a ratio of the airflow through the fan duct to the airflow through the core duct.

As will be appreciated from the description herein, various embodiments of a gas turbine engine are provided. Certain of these embodiments may be an unducted, single rotor gas turbine engine (see FIGS. 1 and 2), a turboprop engine (see FIG. 6), or a ducted gas turbine engine (see FIGS. 7 through 9). Another example of a ducted gas turbine engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to the figures.

For example, in some embodiments of the present disclosure, the engine may include a heat exchanger located in an annular duct, such as in a third stream. The heat exchanger may extend substantially continuously in a circumferential direction of the gas turbine engine (e.g., at least 300 degrees, such as at least 330 degrees).

In one or more of these embodiments, a threshold power or disk loading for a fan (e.g., an unducted single rotor or primary forward fan) may range from 25 horsepower per square foot (hp/ft$^2$) or greater at cruise altitude during a cruise operating mode. In particular embodiments of the engine, structures and methods provided herein generate power loading between 80 hp/ft$^2$ and 160 hp/ft$^2$ or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 pounds per square inch absolute (psia) and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration may be configured to generate at least 25,000 pounds and less than 80,000 of thrust during operation at a rated speed, such as between 25,000 and 50,000 pounds of thrust during operation at a rated speed, such as between 25,000 and 40,000 pounds of thrust during operation at a rated speed. Alternatively, in other exemplary aspects, an engine of the present disclosure may be configured to generate much less power, such as at least 2,000 pounds of thrust during operation at a rated speed.

In various exemplary embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades. Alternatively, in certain suitable embodiments, the fan may only include at least four (4) blades, such as with a fan of a turboprop engine.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio $R_1/R_2$ may be between 1 and 10, or 2 and 7, or at least 3.3, at least 3.5, at least 4 and less than or equal to 7, where $R_1$ is the radius of the primary fan and $R_2$ is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps. Alternatively, in certain suitable embodiments, the engine allows for normal aircraft operation of at least Mach 0.3, such as with turboprop engines.

A fan pressure ratio (FPR) for the primary fan of the fan assembly can be 1.04 to 2.20, or in some embodiments 1.05 to 1.2, or in some embodiments less than 1.08, as measured across the fan blades of the primary fan at a cruise flight condition.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is between 3.0 and 4.0, between 3.2 and 3.5, or between 3.5 and 4.5. In some embodiments, a gear ratio of the input rotational speed to the output rotational speed is greater than 4.1. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 4 to 15 stages, a high-pressure turbine may include 1 to 2 stages, and/or a low pressure turbine (LPT) may include 1 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, L/Dcore is at least 2.5. In some embodiments, the L/Dcore is less than 5, less than 4, and less than 3. In various embodiments, it should be appreciated that the L/Dcore is for a single unducted rotor engine.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine in the embodiments depicted above, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, open rotor, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

As noted above, the inventors of the present disclosure sought to design a gas turbine engine having improved propulsive efficiency. For example, in certain gas turbine engines having a third stream, an efficiency the mid-fan, or ducted secondary fan, may be affected by a back-pressure in the third stream, which is located downstream of the mid-fan. For example, a high back-pressure in the third stream may reduce the efficiency of the mid-fan. Moreover, as will be appreciated from the description hereinabove, the gas turbine engine may include a heat exchanger in the third stream utilizing an airflow through the third stream as a heat sink. An effectiveness of such a heat exchanger may also be affected by the back-pressure in the third stream. For example, a high back-pressure in the third stream may reduce the effectiveness of the heat exchanger.

In order to address these issues, to improve a thrust performance of an exhaust of the turbomachine, or both the inventors of the present disclosure have discovered an airflow mixer assembly for incorporation into a gas turbine engine. The airflow mixer assembly includes one or more low pressure ducts located within a core cowl and extending to a plenum (also located in the core cowl). The airflow mixer assembly further includes an inner shroud configured as a mixer located downstream of the plenum and downstream of an exhaust of the turbomachine. The mixer is in fluid communication with both the plenum and the exhaust for mixing a low pressure airflow from the low pressure duct with an exhaust gas flow from the exhaust. The airflow mixer assembly further includes an outer shroud extending along the circumferential direction and along the axial direction at a location around the mixer and downstream of the mixer.

In certain exemplary embodiments, the exhaust (exiting the turbomachine at a high speed) may mix with the low pressure airflow provided from the one or more low pressure ducts, acting as a venturi pump to pull the airflow through the one or more low pressure ducts.

In certain exemplary embodiments, the one or more low pressure ducts may be in airflow communication with the third stream, e.g., at a location downstream of the heat exchanger. In such a configuration, the airflow mixer assembly may reduce a back-pressure in the third stream, improving the efficiency of the mid-fan and the effectiveness of the heat exchanger. While such a configuration may reduce a thrust output of the third stream, it may increase thrust output from the turbomachine to offset or surpass such a reduction.

Inclusion of the airflow mixer assembly of the present disclosure into a gas turbine engine having a third stream further enables the engine to achieve a desired thrust to power airflow ratio and core bypass ratio by alleviating back-pressure within the third stream, improving an efficiency of the mid-fan and an effectiveness of the heat exchanger in the third stream, and importantly allowing a desire mass airflow through the third stream.

In additional or alternative embodiments, the one or more low pressure ducts may be in airflow communication with a bypass passage over the turbomachine, using such airflow to increase a thrust output from the exhaust of the turbomachine.

Figure 11:
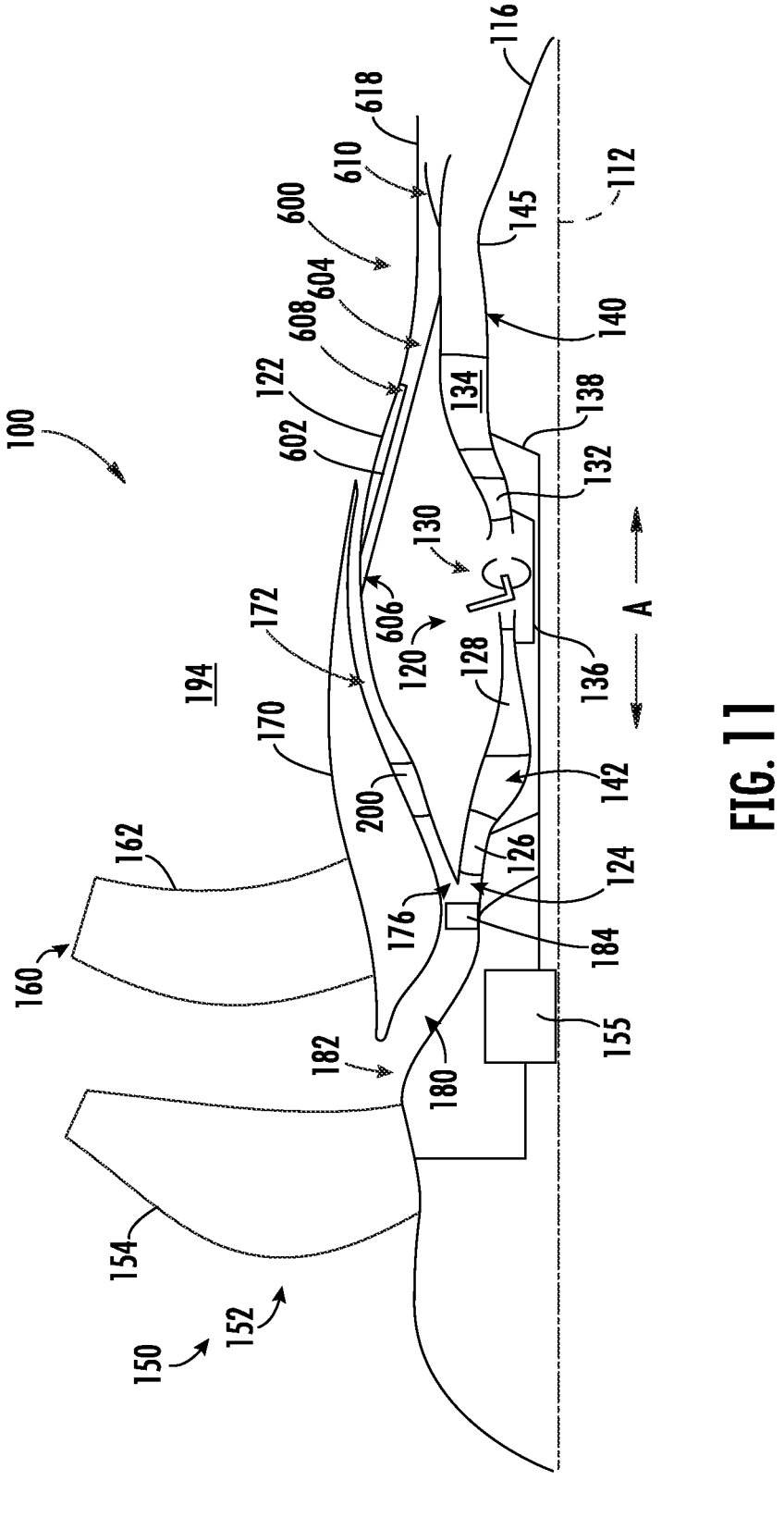
FIG. 11 is a schematic view of an open rotor gas turbine engine having an airflow mixer assembly in accordance with another exemplary aspect of the present disclosure.
Figure 12:
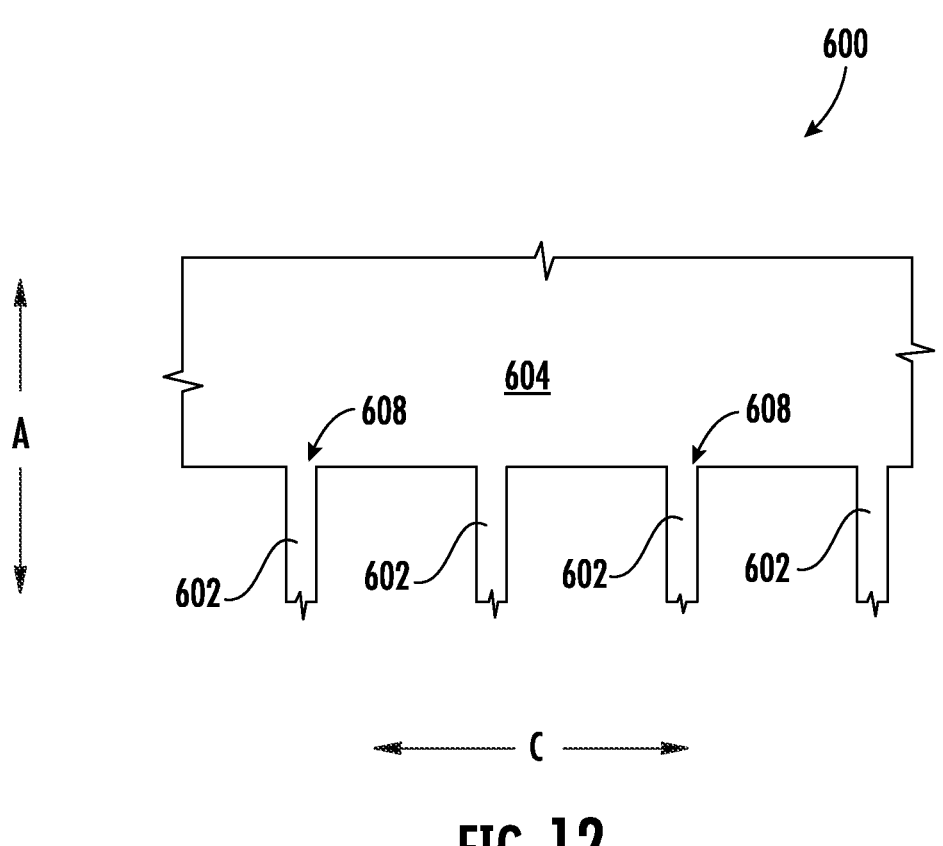
FIG. 12 is a schematic, plan view of the exemplary airflow mixer assembly of FIG. 11.

Referring now to FIG. 11, a close-up, schematic view is provided of a gas turbine engine 100 in accordance with the present disclosure. The exemplary gas turbine engine 100 of FIG. 11 may be configured in a similar manner as the exemplary gas turbine engine 100 of FIG. 1, and the same or similar numbers refer to the same or similar parts.

For example, the exemplary gas turbine engine 100 of FIG. 11 generally includes a turbomachine 120 having a compressor section, a combustion section, a turbine section, and an exhaust 145 (which includes an exhaust nozzle 140) in serial flow order. The exhaust nozzle 140 is a location along the exhaust having a local reduction in cross-sectional area. The gas turbine engine 100 further includes a fan section 150 having a fan 152 drivingly coupled to the turbomachine 120. The fan 152 is an unducted fan having a single stage of unducted rotor blades 154. Airflow from the fan 152 is split between a bypass passage 194 and an inlet duct 180.

Moreover, as with the embodiment of FIG. 1, the gas turbine engine 100 of FIG. 11 include a fan duct 172, also referred to herein as a third stream. Airflow from a ducted fan 184 positioned within the inlet duct 180 is split between the fan duct 172 and a core duct 142 (also referred to as a working gas flowpath of the turbomachine 120).

Further, for the exemplary embodiment depicted, the gas turbine engine 100 additionally includes an airflow mixer assembly 600. The airflow mixer assembly 600 includes a low pressure duct 602 positioned within the core cowl 122 and a plenum 604 extending along a circumferential direction C located downstream of the low pressure duct 602 and in fluid communication with the low pressure duct 602.

In particular, for the embodiment depicted, the low pressure duct 602 is in fluid communication with a low pressure airflow source, and extends between an inlet 606 in fluid communication with the low pressure airflow source and an outlet 608 in fluid communication with the plenum 604. For the embodiment of FIG. 11, the low pressure airflow source is the fan duct 172, which is separate from the core duct 142.

In the embodiment depicted, the gas turbine engine 100 includes a heat exchanger 200 positioned in thermal communication with the fan duct 172. The heat exchanger 200 may be an air-oil heat exchanger, an air-air heat exchanger, or the like. The heat exchanger 200 is depicted as extending completely through the fan duct 172, but in other embodiments, the heat exchanger 200 may define a maximum height (in a direction perpendicular to an airflow direction through the fan duct 172, averaged from a location immediately upstream of the heat exchanger 200 to a location immediately downstream of the heat exchanger; defined within the fan duct 172) less than a maximum height of the fan duct 172, such as between 10% and 100% of the maximum height of the fan duct 172. For the embodiment shown, the low pressure airflow source is the fan duct 172 at a location downstream of where the heat exchanger 200 is in thermal communication with the fan duct 172.

In certain exemplary embodiments, the low pressure duct 602 may be a single low pressure duct 602 (e.g., having a width in the circumferential direction C sufficient to receive a desired amount of airflow).

Alternatively, and in the exemplary embodiment depicted, the low pressure duct 602 is a first low pressure duct 602 and the airflow mixer assembly 600 includes a plurality of low pressure ducts 602 positioned within the core cowl 122 and in fluid communication with the plenum 604. For example, referring now briefly to FIG. 12, a schematic, plan view is provided of a portion of the airflow mixer assembly 600 of FIG. 11. It will be appreciated that the plurality of low pressure ducts 602 extend in an axial direction A of the gas turbine engine 100 and are spaced from one another along the circumferential direction C. The plenum 604 extends in the circumferential direction C and receives airflow from each of the plurality of low pressure ducts 602 (through their respective outlets 608). In certain exemplary embodiments, the plenum 604 extends substantially 360 degrees in the circumferential direction C (e.g., extending continuously along the circumferential direction C, with the exception of any structural supports or the like, such as at least 300 degrees cumulatively in the circumferential direction C).

In certain exemplary embodiments, the plurality of low pressure ducts 602 may include at least two low pressure ducts 602 and up to 50 low pressure ducts 602, such as at least 4, at least 6, or at least 8 low pressure ducts 602, and up 45, up to 40, up to 35, up to 30, up to 25, up to 20, or up to 18 low pressure ducts 602.

Figure 13:
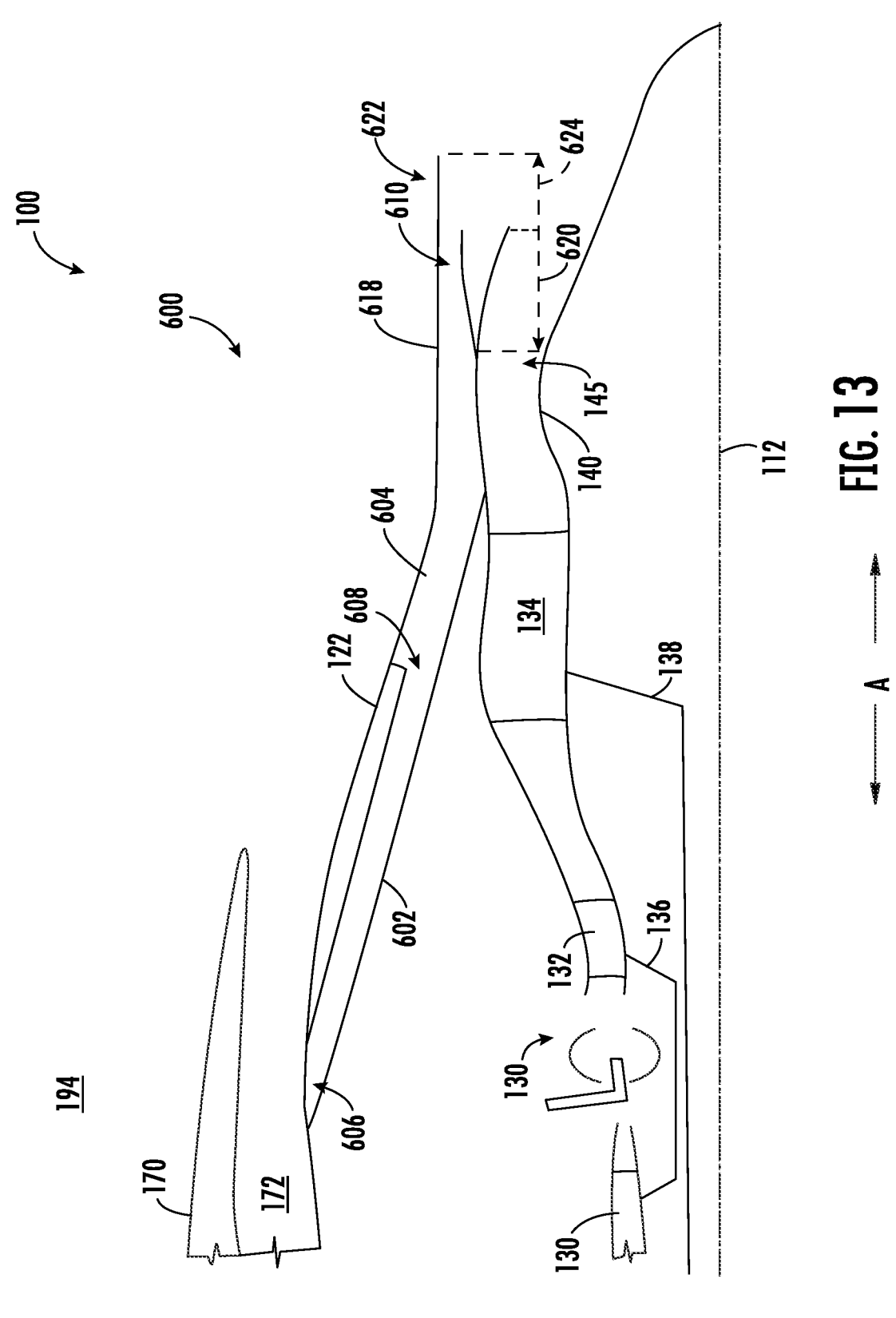
FIG. 13 is a close-up view of the airflow mixer assembly of FIG. 11.

Referring now to FIG. 13, providing a close-up view of the airflow mixer assembly 600 of FIG. 11, it will be appreciated that the airflow mixer assembly 600 further includes a mixer 610 located downstream of the plenum 604 and downstream of the exhaust 145 of the turbomachine 120 and in fluid communication with both the plenum 604 and the exhaust 145. The mixer 610 is configured for mixing a low pressure airflow from the low pressure duct 602 with an exhaust 145 gas flow (e.g., combustion gasses) from the exhaust 145. As used herein, the term "low pressure airflow" simply refers to any airflow anticipated to be at a pressure less than the pressure of the airflow through the exhaust 145.

Figure 14:
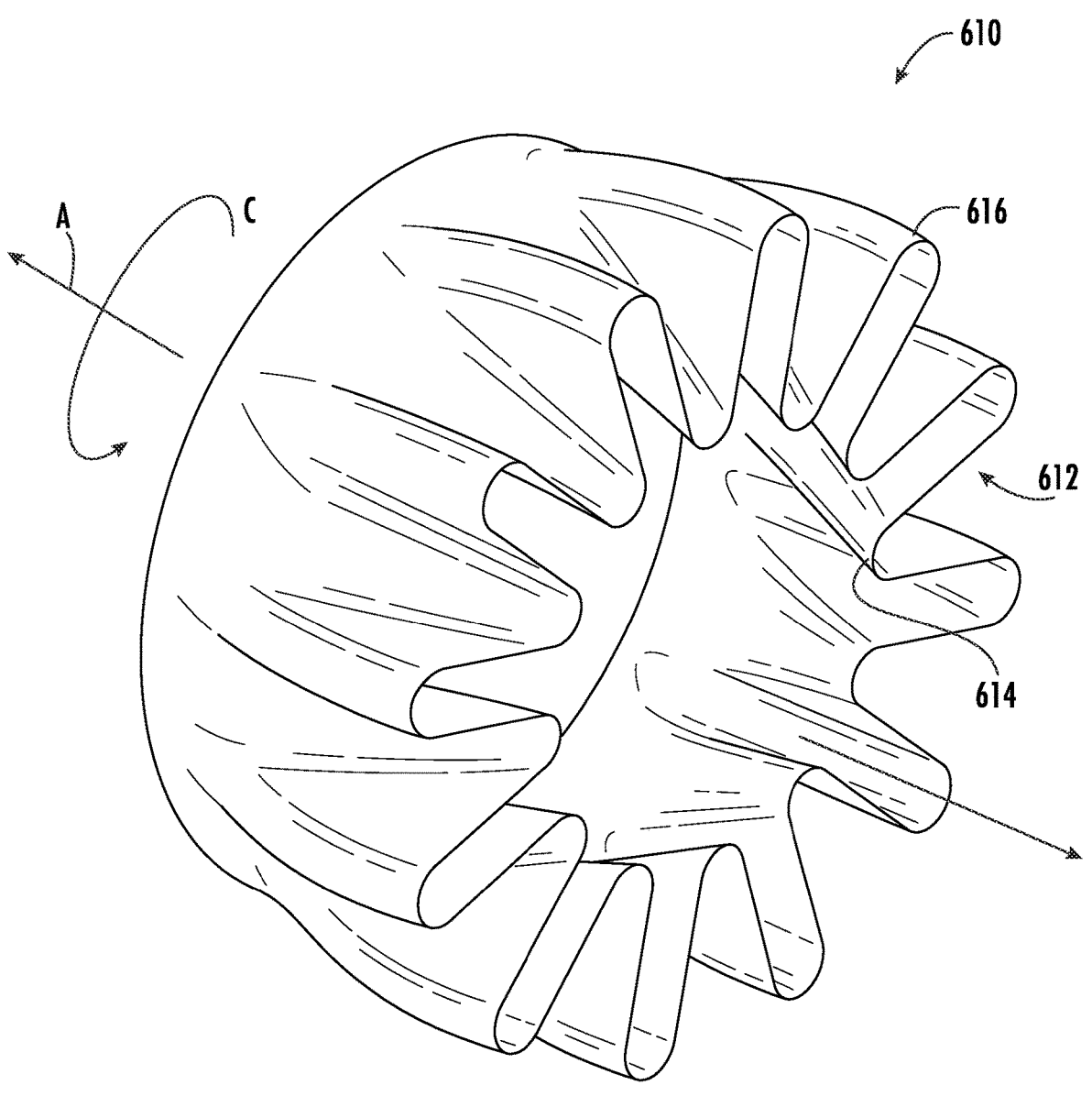
FIG. 14 is a perspective view of a mixer of FIG. 13.

Referring briefly to FIG. 14, providing a perspective view of the mixer 610 of FIG. 13, it will be appreciated that the mixer 610 is an annular mixer having a downstream end 612 defining a substantially sinusoidal pattern forming inner lobes 614 and outer lobes 616 arranged sequentially along a circumference of the downstream end 612. In such a manner, the mixer 610 may be referred to as a daisy mixer. As used herein, the term "substantially sinusoidal" refers to a shape that has curved peaks and valleys in an alternating and sequential manner, resembling a graph of a sine function.

It will be appreciated, however, that in other exemplary embodiments, the mixer 610 may have any other suitable shape or geometry to facilitate mixing of the two airflows (e.g., a shape other than a smooth circular cross-sectional shape). For example, in other exemplary embodiments, the mixer may include tabs, turbulators, local indentations, local protrusions, a sculpted/nonlinear downstream end 612, or combinations thereof in addition to, or in the alternative to, the inner and outer lobes 614, 616 depicted in FIG. 14.

Referring back to FIG. 13, it will be appreciated that the airflow mixer assembly 600 further includes an outer shroud 618 extending along the circumferential direction C and along the axial direction A at a location around the mixer 610 and downstream of the mixer 610. In such a manner, the outer shroud 618 completely encloses the mixer 610.

Notably, in the embodiment depicted, the outer shroud 618 is further located outward of the plenum 604 along the radial direction R, and may form in part the plenum 604 (with other structural components not separately labeled). It will be appreciated, however, that in other embodiments, the outer shroud 618 may start aft of the plenum 604.

More specifically, the mixer 610 defines a length 620 along the axial direction A of the gas turbine engine 100, and the outer shroud 618 defines a downstream portion 622 extending past the mixer 610 along the axial direction A. The downstream portion 622 defines a length 624 along the axial direction A equal to at least 25% and up to 500% of the length 620 of the mixer 610. In particular, in at least certain exemplary embodiments, the length 624 of the downstream portion 622 is equal to at least 50% of the length 620 of the mixer 610, such as at least 75% of the length 620 of the mixer 610 and up to 200% of the length 620 of the mixer 610.

As will be appreciated, the airflow mixer assembly 600 may therefore "pull" low pressure air from and through the low pressure ducts 602 using, e.g., the venturi effect to urge the low pressure air through the low pressure ducts 602 with the relatively high pressure (and high speed) combustion gasses through the exhaust 145. Such a configuration may reduce a back-pressure the fan duct 172, improving an efficiency of the mid-fan 184 (see FIG. 11). Moreover, by positioning the one or more low pressure ducts 602 in airflow communication with the fan duct 172 at a location downstream of the heat exchanger 200, the airflow mixer assembly 600 may further reduce a back-pressure on the heat exchanger 200, improving an effectiveness of the heat exchanger 200. The airflow pulled through the airflow mixer assembly 600 may generate additional thrust from the exhaust 145 of the turbomachine 120 as well.

It will be appreciated, however, that in other exemplary embodiments, the gas turbine engine 100 may have any other suitable configuration. For example, referring now to FIG. 15, a gas turbine engine 100 in accordance with another exemplary embodiment of the present disclosure is provided. The exemplary gas turbine engine 100 of FIG. 15 may be configured in substantially the same manner as the exemplary gas turbine engine 100 of FIGS. 11 through 13, and the same or similar numbers may refer to the same or similar parts.

Figure 15:
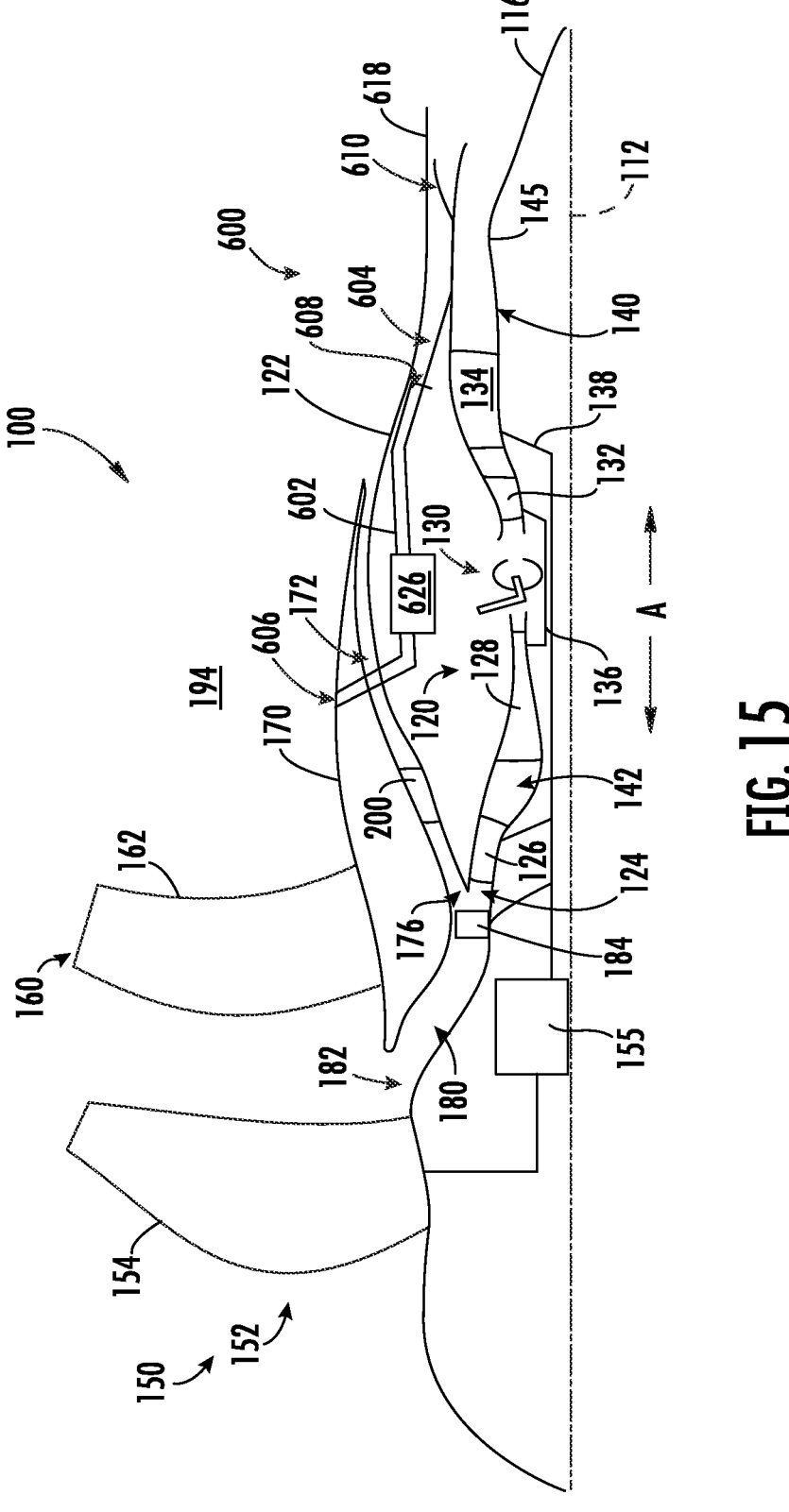
FIG. 15 is a schematic view of an open rotor gas turbine engine having an airflow mixer assembly in accordance with still another exemplary aspect of the present disclosure.

For example, the exemplary gas turbine engine 100 of FIG. 15 generally includes an airflow mixer assembly 600 having a low pressure duct 602, a plenum 604, a mixer 610, and an outer shroud 618. The low pressure duct 602 is in airflow communication with a low pressure airflow source. However, for the embodiment of FIG. 15, the low pressure airflow source is not a fan duct 172 of the gas turbine engine 100, and instead is a bypass passage 194 of the gas turbine engine 100. In such a manner, the low pressure duct 602 extends between an inlet 606 in airflow communication with (and exposed to, in the embodiment depicted) the bypass passage 194 and an outlet 608 in airflow communication with the plenum 604.

Although not depicted, in certain embodiments, the low pressure duct 602 may include a scoop or other similar structure to induce airflow from the bypass passage 194 into the low pressure duct 602.

Further for the embodiment of FIG. 15, the airflow mixer assembly 600 includes a mixer assembly heat exchanger 626 in thermal communication with the low pressure duct 602. The mixer assembly heat exchanger may be an air-oil heat exchanger, an air-air heat exchanger, or any suitable type of heat exchanger.

In certain exemplary embodiments, the airflow mixer assembly 600 may include a plurality of low pressure ducts 602 (see FIG. 12), and may further include a plurality of mixer assembly heat exchangers 626 (e.g., a mixer assembly heat exchanger 626 for each low pressure duct 602).

In such a manner, the airflow mixer assembly 600 may pull air from the bypass passage 194, e.g., using the venturi effect noted above, and use such air as a heat sink for the gas turbine engine 100. The heated air may then be added to the exhaust 145 to increase a thrust output from the turbomachine 120.

It will further be appreciated that in still other exemplary embodiments, the gas turbine engine 100 may have further suitable configurations. For example, referring now to FIG. 16, a gas turbine engine 100 in accordance with still another exemplary embodiment of the present disclosure is provided. The exemplary gas turbine engine 100 of FIG. 16 may also be configured in substantially the same manner as the exemplary gas turbine engine 100 of FIGS. 11 through 13, and the same or similar numbers may refer to the same or similar parts.

Figure 16:
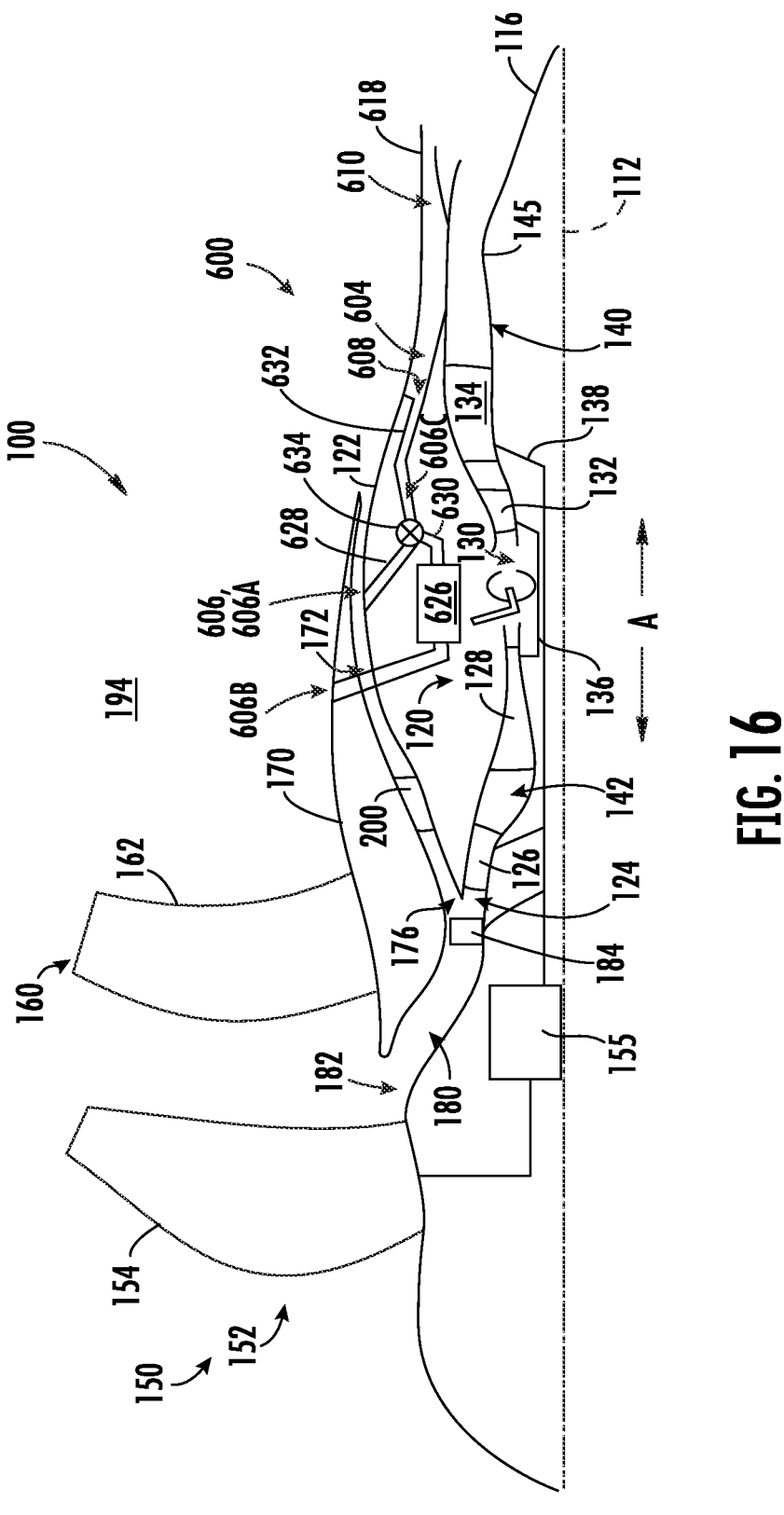
FIG. 16 is a schematic view of an open rotor gas turbine engine having an airflow mixer assembly in accordance with yet another exemplary aspect of the present disclosure.
Figure 17:
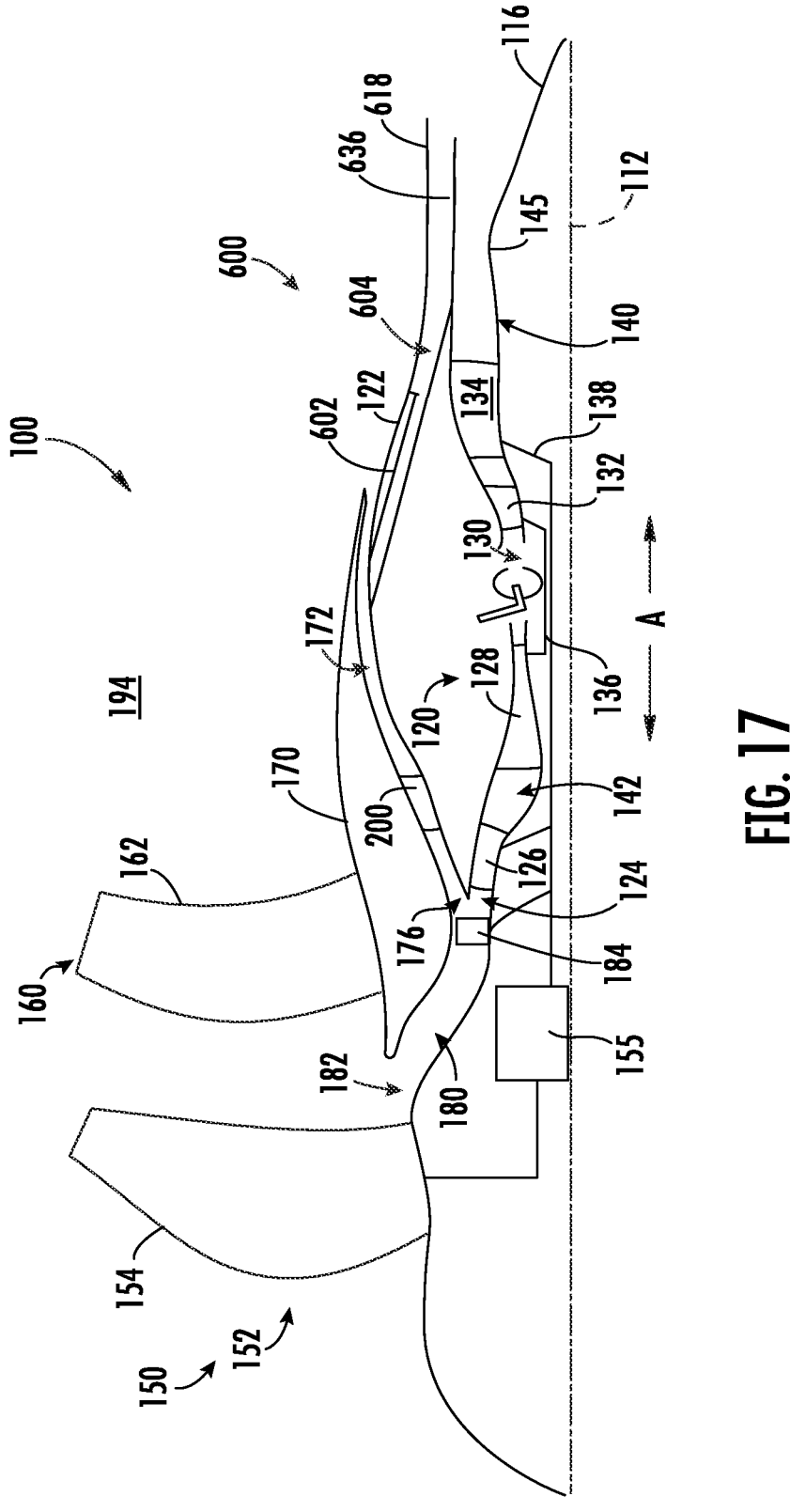
FIG. 17 is a schematic view of an open rotor gas turbine engine having an airflow mixer assembly in accordance with still another exemplary aspect of the present disclosure.

For example, the exemplary gas turbine engine 100 of FIG. 16 generally includes an airflow mixer assembly 600 having a low pressure duct 602, a plenum 604, a mixer 610, and an outer shroud 618. The low pressure duct 602 is in airflow communication with a low pressure airflow source. However, for the exemplary embodiment of FIG. 16, the low pressure airflow source is a first low pressure airflow source, and the low pressure duct 602 is in fluid communication with both the first low pressure airflow source and a second low pressure airflow source of the gas turbine engine 100. More specifically, the low pressure duct 602 is selectively in fluid communication with both the first low pressure airflow source and the second low pressure airflow source.

For the embodiment depicted, the first low pressure airflow source is a fan duct 172 of the gas turbine engine 100 and the second low pressure airflow source is a bypass passage 194 of the gas turbine engine 100.

The low pressure duct 602 includes a first portion 628 defining a first inlet 606A in airflow communication with the fan duct 172, a second portion 630 defining a second inlet 606B in airflow communication with the bypass passage 194, and third portion 632 defining a third inlet 606C selectively in airflow communication with the first portion 628, the second portion 630, or both. In particular, the airflow mixer assembly 600 includes a variable three way valve 634, and the third portion 632 is selectively in airflow communication with the first portion 628, the second portion 630, or both through the variable three way valve 634.

In such a manner, the airflow mixer assembly 600 may function in a similar manner as the exemplary airflow mixer assembly 600 of FIG. 11, as the exemplary airflow mixer assembly 600 of FIG. 15, or both.

It will further be appreciated that in still other exemplary embodiments, the gas turbine engine 100 may have further suitable configurations. For example, referring now to FIG. 17, a gas turbine engine 100 in accordance with yet another exemplary embodiment of the present disclosure is provided. The exemplary gas turbine engine 100 of FIG. 17 may also be configured in substantially the same manner as the exemplary gas turbine engine 100 of FIGS. 11 through 13, and the same or similar numbers may refer to the same or similar parts.

For example, the exemplary gas turbine engine 100 of FIG. 16 generally includes an airflow mixer assembly 600 having a low pressure duct 602, a plenum 604, and an outer shroud 618. The airflow mixer assembly 600 further includes an inner shroud 636. However, for the embodiment depicted, the inner shroud 636 is not configured as a mixer (like mixer 610 described above) and is instead configured as an annular wall defining a circular cross-sectional shape with respect to a longitudinal axis 112 and extending along an axial direction A of the gas turbine engine 100. Such a configuration may still accommodate mixing of a low pressure airflow from the low pressure duct 602 with an exhaust gas flow (e.g., combustion gasses) from the exhaust 145, but may require a longer outer shroud 618 along the axial direction A to achieve a desired amount of mixing (e.g., having a length 624 of a downstream portion 622 along the axial direction A equal to at least 100% and up to 500% of the length 620 of the mixer 610; see FIG. 13).

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; and a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct.

The gas turbine engine of any preceding clause, wherein the thrust to power airflow ratio and the core bypass ratio are defined when the gas turbine engine is operated at a rated speed during standard day operating conditions.

The gas turbine engine of any preceding clause, wherein the thrust to power airflow ratio between 4 and 75.

The gas turbine engine of any preceding clause, wherein the primary fan is an unducted primary fan, and wherein the thrust to power airflow ratio between 30 and 60.

The gas turbine engine of any preceding clause, wherein the thrust to power airflow ratio between 35 and 50.

The gas turbine engine of any preceding clause, wherein the core bypass ratio between 0.3 and 5.

The gas turbine engine of any preceding clause, wherein the gas turbine engine is a turboprop engine, and wherein the thrust to power airflow ratio between 40 and 100.

The gas turbine engine of any preceding clause, wherein the primary fan is a ducted primary fan, and wherein the thrust to power airflow ratio is between 3.5 and 40.

The gas turbine engine of any preceding clause, wherein the gas turbine engine is a direct drive gas turbine engine, and wherein the thrust to power airflow ratio is between 3.5 and 20.

The gas turbine engine of any preceding clause, wherein the gas turbine engine is a geared gas turbine engine, and wherein the thrust to power airflow ratio is between 8 and 40.

The gas turbine engine of any preceding clause, wherein the secondary fan is a single stage secondary fan.

The gas turbine engine of any preceding clause, wherein the secondary fan is a multi-stage secondary fan.

The gas turbine engine of any preceding clause, wherein the multi-stage secondary fan is a two stage secondary fan.

The gas turbine engine of any preceding clause, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is downstream of the bypass passage outlet.

The gas turbine engine of any preceding clause, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is upstream of the bypass passage outlet.

A method of operating a gas turbine engine, comprising: operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, and wherein the core bypass ratio is a ratio of the airflow through the fan duct to the airflow through the core duct.

The method of any preceding clause, wherein the thrust to power airflow ratio between 4 and 75.

The method of any preceding clause, wherein the primary fan is an unducted primary fan, and wherein the thrust to power airflow ratio between 30 and 60.

The method of any preceding clause, wherein the thrust to power airflow ratio between 35 and 50.

The method of any preceding clause, wherein the core bypass ratio between 0.3 and 5.

A gas turbine engine defining an axial direction, a radial direction, and a circumferential direction, the gas turbine engine comprising: a turbomachine comprising a compressor section, a combustion section, a turbine section, and an exhaust arranged in serial flow order, the turbomachine defining an engine inlet to an inlet duct, a fan duct inlet to a fan duct, and a core inlet to a core duct, the turbomachine further comprising a core cowl enclosing at least in part the turbine section and the exhaust; a primary fan driven by the turbomachine; and a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and an airflow mixer assembly comprising: a low pressure duct positioned within the core cowl; a plenum extending along the circumferential direction located downstream of the low pressure duct and in fluid communication with the low pressure duct; an inner shroud located downstream of the plenum and downstream of the exhaust and in fluid communication with both the plenum and the exhaust; and an outer shroud located outward of the plenum along the radial direction and extending along the circumferential direction and along the axial direction over and downstream of the inner shroud.

The gas turbine engine of any preceding clause, wherein the inner shroud is a mixer.

The gas turbine engine of any preceding clause, wherein the mixer is an annular mixer having a downstream end defining a substantially sinusoidal pattern forming inner lobes and outer lobes arranged sequentially along a circumference of the downstream end.

The gas turbine engine of any preceding clause, wherein the mixer defines a length along the axial direction of the gas turbine engine, and wherein the outer shroud defines a downstream portion extending past the mixer along the axial direction, wherein the downstream portion defines a length along the axial direction equal to at least 25% and up to 500% of the length of the mixer.

The gas turbine engine of any preceding clause, wherein the length of the downstream portion is equal to at least 50% of the length of the mixer.

The gas turbine engine of any preceding clause, wherein the airflow mixer assembly comprises a plurality of low pressure ducts positioned within the core cowl and in fluid communication with the plenum, and wherein the low pressure duct is a first low pressure duct of the plurality of low pressure ducts.

The gas turbine engine of any preceding clause, wherein the plenum is an annular plenum extending substantially 360 degrees in the circumferential direction.

The gas turbine engine of any preceding clause, wherein the low pressure duct is in fluid communication with a low pressure airflow source.

The gas turbine engine of any preceding clause, wherein the turbomachine defines a working gas flowpath, wherein the gas turbine engine defines a third stream separate from the working gas flowpath, and wherein the low pressure airflow source is the third stream.

The gas turbine engine of any preceding clause, further comprising: a heat exchanger positioned in thermal communication with the third stream, and wherein the low pressure airflow source is the third stream at a location downstream of where the heat exchanger is in thermal communication with the third stream.

The gas turbine engine of any preceding clause, wherein the gas turbine engine defines a bypass passage outward of the turbomachine along the radial direction, and wherein the low pressure airflow source is the bypass passage of the gas turbine engine.

The gas turbine engine of any preceding clause, further comprising: a heat exchanger positioned in thermal communication with low pressure duct.

The gas turbine engine of any preceding clause, wherein the low pressure airflow source is a first low pressure airflow source, wherein the low pressure duct is in fluid communication with the first low pressure airflow source and a second low pressure airflow source.

The gas turbine engine of any preceding clause, wherein the turbomachine defines a working gas flowpath, wherein the gas turbine engine defines a third stream separate from the working gas flowpath and a bypass passage outward of the turbomachine along the radial direction, wherein the first low pressure airflow source is the third stream and the second low pressure airflow source is the bypass passage.

The gas turbine engine of any preceding clause, wherein the airflow mixer assembly further comprises a variable three way valve, and wherein the low pressure duct is in selective fluid communication with the first low pressure airflow source and the second low pressure airflow source.

The gas turbine engine of any preceding clause, wherein the fan is an unducted fan having a single stage of unducted rotor blades.

A gas turbine engine defining a radial direction, an axial direction, and a circumferential direction, the gas turbine engine comprising: a fan section comprising a fan drivingly coupled to the turbomachine; a turbomachine having a compressor section, a combustion section, a turbine section, and an exhaust in serial flow order, the turbomachine further comprising a core cowl enclosing at least in part the turbine section and the exhaust; and an airflow mixer assembly comprising: a low pressure duct positioned within the core cowl; a plenum extending along the circumferential direction located downstream of the low pressure duct and in fluid communication with the low pressure duct; a mixer located downstream of the plenum and downstream of the exhaust and in fluid communication with both the plenum and the exhaust for mixing a low pressure airflow from the low pressure duct with an exhaust gas flow from the exhaust; and an outer shroud extending along the circumferential direction and along the axial direction at a location around the mixer and downstream of the mixer.

The gas turbine engine of any preceding clause, wherein the low pressure duct is in fluid communication with a low pressure airflow source, wherein the turbomachine defines a working gas flowpath, wherein the gas turbine engine defines a third stream separate from the working gas flowpath, and wherein the low pressure airflow source is the third stream.

The gas turbine engine of any preceding clause, wherein the low pressure duct is in fluid communication with a low pressure airflow source, wherein the gas turbine engine defines a bypass passage outward of the turbomachine along the radial direction, and wherein the low pressure airflow source is the bypass passage of the gas turbine engine.

An airflow mixer assembly for a gas turbine engine having a turbomachine, the turbomachine having an exhaust and a core cowl, the airflow mixer assembly comprising: a low pressure duct configured to be positioned within the core cowl when the airflow mixer assembly is installed in the gas turbine engine; a plenum located downstream of the low pressure duct and in fluid communication with the low pressure duct; a mixer located downstream of the plenum and in fluid communication with the plenum, the mixer configured to be located downstream of the exhaust and in fluid communication with the exhaust when the airflow mixer assembly is installed in the gas turbine engine; and an outer shroud surrounding the mixer and extending downstream of the mixer.

We claim:

1. An airflow mixer assembly for a gas turbine engine having a turbomachine, the turbomachine having an exhaust and a core cowl, the airflow mixer assembly comprising:

a low pressure duct configured to be positioned within the core cowl when the airflow mixer assembly is installed in the gas turbine engine;

a plenum located downstream of the low pressure duct and in fluid communication with the low pressure duct;

a mixer located downstream of the plenum and in fluid communication with the plenum, the mixer configured to be located downstream of the exhaust and in fluid communication with the exhaust when the airflow mixer assembly is installed in the gas turbine engine;

an outer shroud surrounding the mixer and extending downstream of the mixer; and a variable three way valve, and wherein the low pressure duct is in selective fluid communication with a first low pressure airflow source and a second low pressure airflow source via the variable three way valve.

2. A gas turbine engine defining a radial direction, an axial direction, and a circumferential direction, the gas turbine engine comprising:

a turbomachine having a compressor section, a combustion section, a turbine section, and an exhaust in serial flow order, the turbomachine further comprising a core cowl enclosing at least in part the turbine section and the exhaust;

a fan section comprising a fan drivingly coupled to the turbomachine; and an airflow mixer assembly comprising:

a low pressure duct positioned within the core cowl;

a plenum extending along a circumferential direction located downstream of the low pressure duct and in fluid communication with the low pressure duct;

a mixer located downstream of the plenum and downstream of the exhaust and in fluid communication with both the plenum and the exhaust for mixing a low pressure airflow from the low pressure duct with an exhaust gas flow from the exhaust;

an outer shroud extending along the circumferential direction and along the axial direction at a location around the mixer and downstream of the mixer; and a variable three way valve, and wherein the low pressure duct is in selective fluid communication with a first low pressure airflow source and a second low pressure airflow source via the variable three way valve.

3. The gas turbine engine of claim 2, wherein the turbomachine defines a working gas flowpath, wherein the gas turbine engine defines a third stream separate from the working gas flowpath, and wherein the first low pressure airflow source is the third stream.

4. The gas turbine engine of claim 2, wherein the gas turbine engine defines a bypass passage outward of the turbomachine along the radial direction, and wherein the second low pressure airflow source is the bypass passage of the gas turbine engine.

5. A gas turbine engine defining an axial direction, a radial direction, and a circumferential direction, the gas turbine engine comprising:

a turbomachine comprising a compressor section, a combustion section, a turbine section, and an exhaust arranged in serial flow order, the turbomachine defining an engine inlet to an inlet duct, a fan duct inlet to a fan duct, and a core inlet to a core duct, the turbomachine further comprising a core cowl enclosing at least in part the turbine section and the exhaust;

a primary fan driven by the turbomachine;

a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and an airflow mixer assembly comprising:

a low pressure duct positioned within the core cowl;

a plenum extending along the circumferential direction located downstream of the low pressure duct and in fluid communication with the low pressure duct;

an inner shroud located downstream of the plenum and downstream of the exhaust and in fluid communication with both the plenum and the exhaust; and an outer shroud located outward of the plenum along the radial direction and extending along the circumferential direction and along the axial direction over and downstream of the inner shroud.

6. The gas turbine engine of claim 5, wherein the inner shroud is a mixer.

7. The gas turbine engine of claim 6, wherein the mixer is an annular mixer having a downstream end defining a substantially sinusoidal pattern forming inner lobes and outer lobes arranged sequentially along a circumference of the downstream end.

8. The gas turbine engine of claim 6, wherein the mixer defines a length along the axial direction of the gas turbine engine, and wherein the outer shroud defines a downstream portion extending past the mixer along the axial direction, wherein the downstream portion defines a length along the axial direction equal to at least 25% and up to 500% of the length of the mixer.

9. The gas turbine engine of claim 8, wherein the length of the downstream portion is equal to at least 50% of the length of the mixer.

10. The gas turbine engine of claim 5, wherein the airflow mixer assembly comprises a plurality of low pressure ducts positioned within the core cowl and in fluid communication with the plenum, and wherein the low pressure duct is a first low pressure duct of the plurality of low pressure ducts.

11. The gas turbine engine of claim 5, wherein the plenum is an annular plenum extending substantially 360 degrees in the circumferential direction.

12. The gas turbine engine of claim 5, wherein the low pressure duct is in fluid communication with a low pressure airflow source.

13. The gas turbine engine of claim 12, wherein the turbomachine defines a working gas flowpath, wherein the gas turbine engine defines a third stream separate from the working gas flowpath, and wherein the low pressure airflow source is the third stream.

14. The gas turbine engine of claim 13, further comprising:

a heat exchanger positioned in thermal communication with the third stream, and wherein the low pressure airflow source is the third stream at a location downstream of where the heat exchanger is in thermal communication with the third stream.

15. The gas turbine engine of claim 12, wherein the gas turbine engine defines a bypass passage outward of the turbomachine along the radial direction, and wherein the low pressure airflow source is the bypass passage of the gas turbine engine.

16. The gas turbine engine of claim 12, further comprising:

a heat exchanger positioned in thermal communication with low pressure duct.

17. The gas turbine engine of claim 12, wherein the low pressure airflow source is a first low pressure airflow source, wherein the low pressure duct is in fluid communication with the first low pressure airflow source and a second low pressure airflow source.

18. The gas turbine engine of claim 17, wherein the turbomachine defines a working gas flowpath, wherein the gas turbine engine defines a third stream separate from the working gas flowpath and a bypass passage outward of the turbomachine along the radial direction, wherein the first low pressure airflow source is the third stream and the second low pressure airflow source is the bypass passage.

19. The gas turbine engine of claim 17, wherein the airflow mixer assembly further comprises a variable three way valve, and wherein the low pressure duct is in selective fluid communication with the first low pressure airflow source and the second low pressure airflow source via the variable three way valve.

20. The gas turbine engine of claim 5, wherein the primary fan is an unducted fan having a single stage of unducted rotor blades.

* * * * *